(12) United States Patent
Shete et al.

(10) Patent No.: US 12,526,194 B2
(45) Date of Patent: Jan. 13, 2026

(54) IMPLEMENTING A POLICY-BASED FRAMEWORK FOR O-CLOUD RESOURCE MANAGEMENT AND ORCHESTRATION SERVICES IN A TELECOMMUNICATIONS NETWORK

(71) Applicant: RAKUTEN MOBILE, INC., Tokyo (JP)

(72) Inventors: Pankaj Tanaji Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 100 days.

(21) Appl. No.: 18/693,259

(22) PCT Filed: Dec. 28, 2023

(86) PCT No.: PCT/US2023/086141
§ 371 (c)(1),
(2) Date: Mar. 19, 2024

(87) PCT Pub. No.: WO2024/158521
PCT Pub. Date: Aug. 2, 2024

(65) Prior Publication Data
US 2025/0126016 A1 Apr. 17, 2025

Related U.S. Application Data

(60) Provisional application No. 63/441,457, filed on Jan. 27, 2023.

(51) Int. Cl.
*G06F 15/173* (2006.01)
*H04L 41/0894* (2022.01)
*H04L 41/40* (2022.01)
*H04L 41/5019* (2022.01)

(52) U.S. Cl.
CPC .......... *H04L 41/0894* (2022.05); *H04L 41/40* (2022.05); *H04L 41/5019* (2013.01)

(58) Field of Classification Search
CPC .. H04L 41/0894; H04L 41/40; H04L 41/5019
See application file for complete search history.

(56) References Cited

U.S. PATENT DOCUMENTS

2024/0214272 A1* 6/2024 Ying .................... H04L 41/0894
2024/0224118 A1* 7/2024 Trivedi ............. H04W 28/0925

\* cited by examiner

*Primary Examiner* — Joseph R Maniwang
(74) *Attorney, Agent, or Firm* — Sughrue Mion, PLLC

(57) ABSTRACT

Systems and methods for implementing a policy-based framework for O-Cloud Resource Management and Orchestration Services are provided. The method includes: determining, a network function (NF) hosted on a O-Cloud node to be instantiated on another O-Cloud nodes; creating an instantiation policy for the determined NF for the ORMOS; sending the instantiation policy via an R1 interface to the ORMOS; requesting an instantiation implementation of the determined NF via an O2 interface to at least one O-Cloud management service; instantiating a NF on the other O-Cloud nodes according to the implementation request; sending a registration and configuration request for the instantiated NF to NF-related RAN OAM Services; sending a configuration notice for the instantiated NF to the ORMOS; and sending instructions to finalize the instantiation implementation of the determined NF to the at least one O-Cloud management service.

20 Claims, 14 Drawing Sheets

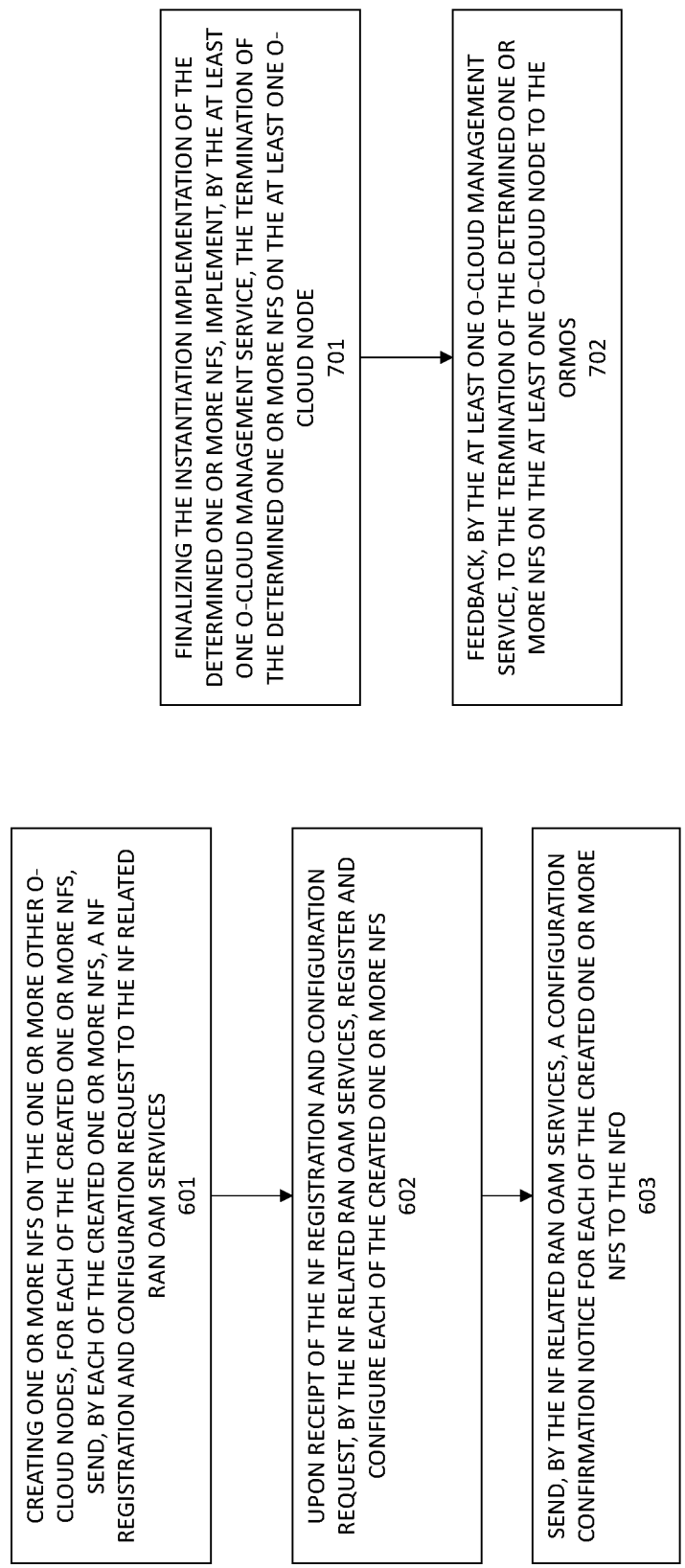

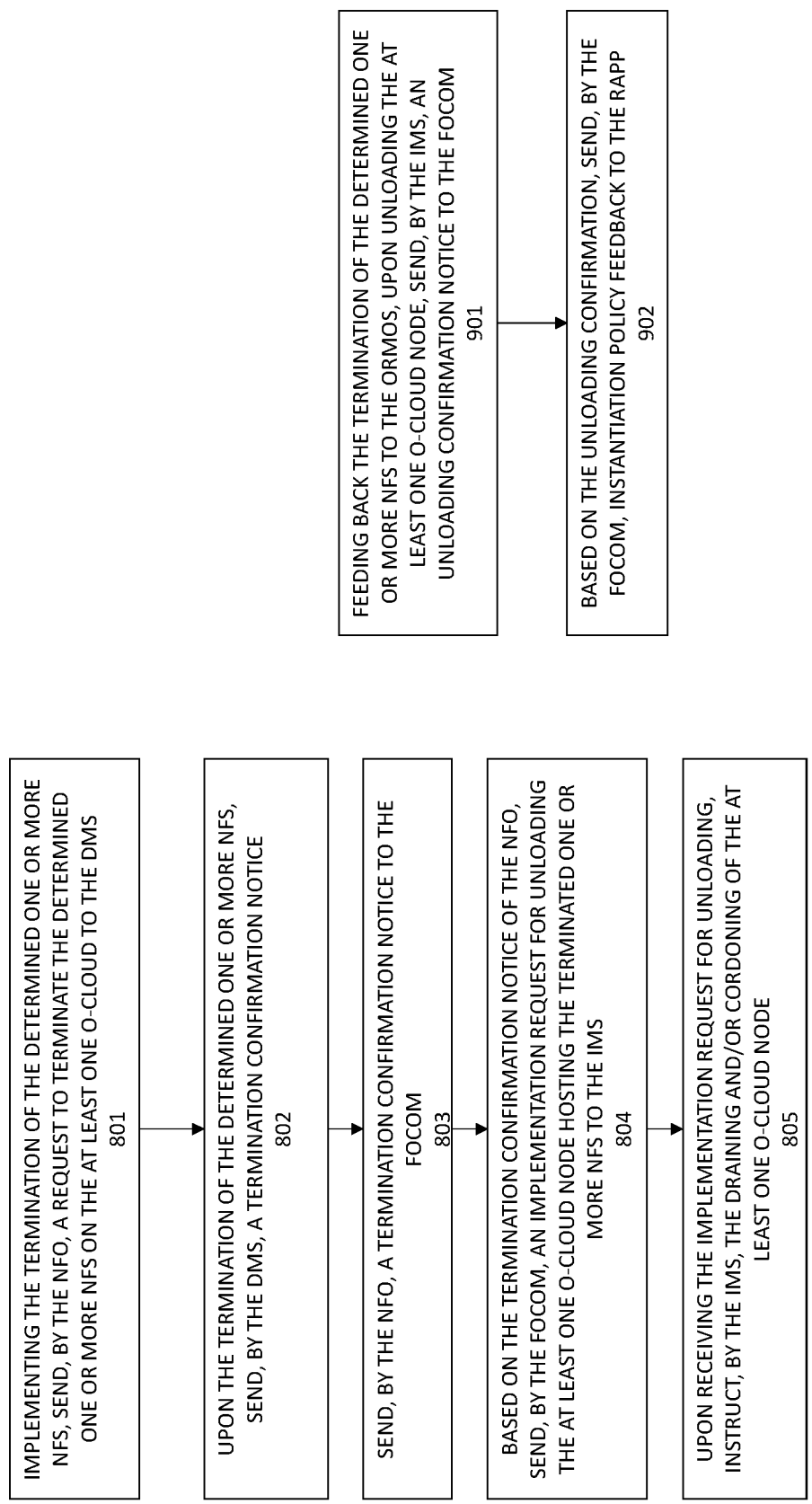

IMPLEMENTING A POLICY-BASED FRAMEWORK FOR O-CLOUD RESOURCE MANAGEMENT AND ORCHESTRATION SERVICES IN A TELECOMMUNICATIONS NETWORK

CROSS-REFERENCE TO RELATED APPLICATION(S)

This application is based on and claims priority from U.S. Provisional Patent Application No. 63/441,457, filed at the U.S. Patent Office on Jan. 27, 2023, the disclosure of which is incorporated by reference herein in its entirety.

TECHNICAL FIELD

Example embodiments of the present disclosure relate to the implementation of a policy-based framework for O-Cloud resource management and orchestration services.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, the hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps. The functionalities include: providing policy (i.e., a set of rules that are used to manage and control the changing and/or maintaining of the state of one or more managed objects) based on guidance and enrichment across the A1 interface, which is the interface that enables the communication between the NRT-RIC and the nRT-RIC; performing data analytics; Artificial Intelligence/Machine Learning (AI/ML) training and inference for RAN optimization; and/or recommending configuration management actions over the O1 interface for managing the operation and maintenance (OAM), which is the interface that connects the SMO to RAN managed elements (e.g., nRT-RIC, O-RAN Centralized Unit (O-CU), O-RAN Distributed Unit (O-DU), etc.). The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 nodes (i.e., network functions such as O-CU-CP, O-CU-UP, O-DU, and O-eNB) via policies, wherein the O-DU connects to the O-RU over the FrontHaul including a Control User Synchronization (CUS) plane and the Management (M) plane. For example, the nRT sets policy parameters on activated functions of the E2 nodes. Further, the nRT-RIC hosts xApps to implement functions such as quality of service (QOS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning (AI/ML) models enforced and used by the nRT-RIC for RAN optimization, and the nRT returns policy feedback (i.e., how the policy set by the NRT-RIC works).

The SMO framework, within which the NRT-RIC is located, manages and orchestrates RAN elements. In particular, the SMO includes O-Cloud Resource Management and Orchestration Services. The O-Cloud Resource Management and Orchestration Services include a Federated O-Cloud Orchestration and Management (FOCOM) and a Network Function Orchestrator (NFO) that manages Virtual Machines (VM) based Virtual Network Functions (VNF) and/or could native network functions (CNF) and container (i.e., instance) based VNF and/or CNF.

The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO interacts with O-Cloud management services such as, for example, infrastructure management services (IMS) and deployment management services (DMS) that are provided by O-Cloud, wherein the IMS provides functions that are responsible for the deployment and management of cloud infrastructures (i.e., the IMS orchestrates the O-Cloud infrastructure) and wherein the DMS provides functions responsible for the management of virtualized/containerized deployments on the O-Cloud infrastructure (i.e., the DMS orchestrates the virtualized/containerized deployments of the E2 nodes applications).

Moreover, according to the related art, during the operation of the O-RAN architecture, after an instantiation of E2 nodes (i.e., a virtualized/containerized deployment of the network functions (NFs) such as VNF and/or CNF) to the O-Cloud infrastructure (i.e., a deployment to one or more O-Cloud nodes), the NFs (i.e., a VNF and/or CNF) and/or the O-Cloud nodes (i.e., physical hosts such as servers or server clusters of the O-Cloud infrastructure) that are hosting one or more NFs may suffer abnormalities such as, for example, performance degradation over time and/or at topographic locations within the O-RAN.

In another example, during the operation of the O-RAN architecture, after an instantiation of E2 nodes (i.e., a virtualized/containerized deployment of the network functions (NFs) such as VNF and/or CNF) to the O-Cloud infrastructure (i.e., a deployment to one or more O-Cloud nodes), the NFs (i.e., a VNF and/or CNF) and/or the O-Cloud nodes (i.e., physical hosts such as servers or server clusters of the O-Cloud infrastructure) that are hosting one or more NFs maybe outdated, for example, with regard to the resource scaling to host NFs on the O-Cloud nodes and/or changes in demands of tenant operators regarding updated service levels as required by updated service-level agreements (SLA) SLAs between the host operator (the RAN operator).

In each of the above example cases, an updated configuration of the O-Cloud nodes and/or the NFs needs to be provided in order to respond correctly to the current state (or the targeted state through updated metrics according to the required service levels) of the O-Cloud infrastructure on which the applications (e.g., the one or more NFs) are orchestrated.

Referring to FIG. 1, the SMO (i.e., the NFO and/or the FOCOM) schedules one or more O-Cloud nodes within the O-Cloud infrastructure according to the O-RAN architecture of the related prior art, as set forth above. The scheduling refers to selecting one or more O-cloud nodes that are suitable to perform a particular workload (i.e., to host one or more NFs such as VNF and/or CNF), where an O-Cloud node according to the related art is defined as suitable if certain resources are not explicitly claimed (i.e., its suitability depends on the remaining unused hardware resources of the O-Cloud node). For example, the FOCOM and/or the NFO may control the scheduling (instantiation), whereas the implementation may be applied by the IMS and/or DMS to one or more NFs and/or one or more O-Cloud nodes, respectively. To this end, the scheduling of O-Cloud nodes according to the related art is focused on discrete pre-defined hardware resources of the O-Cloud infrastructure.

Moreover, according to the related art, the NRT-RIC framework has no capabilities to push policies to NFO/FOCOM over the R1 interface through O-Cloud Resource Management and Orchestration Services (OMRO) related functions.

As a result, the related state does not provide for a policy-based framework for the OMRO-related functions (i.e., ORMOS), and the scheduling by the NFO/FOCOM according to the related art has the disadvantage that it is based on discrete predefined hardware resources of one or more O-Cloud nodes. This lack of capabilities of the related art may result in ineffective utilization and reduced performance of one or more NFs and/or O-Cloud nodes hosting one or more NFs.

SUMMARY

Example embodiments provide an implementation of a policy-based framework for O-Cloud Resource Management and Orchestration Services in a telecommunications network, wherein the scheduling of one or more O-Cloud nodes is based on a policy-based framework provided from an rApp (e.g., R1 Services) in the NRT-RIC framework (i.e., within the SMO framework) to at least one O-Cloud Resource Management and Orchestration Services (ORMOS) (e.g., NFO and/or FOCOM) via the R1 interface and the SMO's communication between the NRT-RIC framework and the ORMOS. In particular, the systems and methods provide a policy (e.g., an R1-policy) from an rApp for instantiation (i.e., relocation) of one or more NFs to one or more other O-Cloud nodes by the rApp.

To this end, the NRT-RIC framework (i.e., the rApp) may use data referring to utilization patterns of at least one O-Cloud node and/or one or more NFs hosted thereon (e.g., the rApp may subscribe to telemetric data services such as O1-related services from NF-related radio access network (RAN) Operations, Administration and Maintenance (OAM) Services (NF-related RAN OAM services), O2-related services from the ORMOS, etc.) as input data for creating the policy (i.e., the R1-policy) for the ORMOS. The ORMOS request the DMS/IMS to implement an instantiation of one or more NFs (e.g. instantiation of one or more CNFs), wherein the DMS/IMS instruct the O-Cloud infrastructure to instantiate one or more NFs and send a registration and configuration request to the NF-related OAM Services. Upon registration and configuration, the NF-related OAM Services confirm the instantiation to ORMOS, and ORMOS requests the termination of one or more NFs from the O-Cloud nodes that originally hosted the NFs.

As a result, the policy-based framework guides the ORMOS (i.e., NFO/FOCOM) to effectively schedule (deploy) resources of the O-Cloud infrastructure (i.e., select, instantiate, relocate NFs on the O-Cloud infrastructure). Moreover, based on the R1 policies and the optimized capabilities to receive R1 policies and/or actions from rApps, the NFO and the FOCOM can interact based on common policies (i.e., the R1 policy) which allow the SMO to dynamically request hardware resources (i.e., one or more O-Cloud nodes).

The policy-based framework for the ORMOS has the advantage of guidance on how to instantiate NFs (i.e., VNFs and/or CNFs) based on multiple scenarios that may include, among other scenarios, the effective implementation of an SLA change and the energy-efficient and, in an O-Cloud, resource-optimized operation according to the metrics as defined in the SLA, without performance degradation of the NFs and/or the O-Cloud nodes. This enables an optimal (e.g., energy-efficient, resource-optimized, resilience-optimized, etc.) operational performance of the O-RAN.

According to an embodiment, a system includes an rApp, at least one O-Cloud management service, NF-related RAN OAM Services and O-Cloud Resource Management and Orchestration Services (ORMOS) configured to determine, by an rApp within a service management orchestration framework (SMO), one or more network functions (NFs) hosted on at least one O-Cloud node to be instantiated on one or more other O-Cloud nodes; create, by the rApp, an instantiation policy for the determined one or more NFs for the O-Cloud Resource Management and Orchestration Services (ORMOS), wherein the ORMOS may include a Network Function Orchestrator (NFO) and a Federated O-Cloud Orchestration and Management (FOCOM); send, by the rApp, the instantiation policy via an R1 interface to the ORMOS; based on the instantiation policy, request, by the ORMOS, an instantiation implementation of the determined one or more NFs via an O2 interface to at least one O-Cloud management service; upon receiving the implementation request, instantiate, by the at least one O-Cloud management service, one or more NFs on the one or more other O-Cloud nodes according to the implementation request, wherein the at least one O-Cloud management service may include deployment management services (DMS) and infrastructure management services (IMS); send, by the at least one O-Cloud management service, a registration and configuration request for the instantiated one or more NFs to NF-related radio access network (RAN) Operations, Administration and Maintenance (OAM) Services; based on the registration and configuration request, send, by the NF-related RAN OAM Services, a configuration notice for the instantiated one or more NFs to the ORMOS; and send, by the ORMOS, instructions to finalize the instantiation implementation of the determined one or more NFs to the at least one O-Cloud management service.

According to an embodiment, a method includes determining, by an rApp within a service management orchestration framework (SMO), one or more network functions (NFs) hosted on at least one O-Cloud node to be instantiated on one or more other O-Cloud nodes; creating, by the rApp, an instantiation policy for the determined one or more NFs for the O-Cloud Resource Management and Orchestration Services (ORMOS), wherein the ORMOS may include a Network Function Orchestrator (NFO) and a Federated O-Cloud Orchestration and Management (FOCOM); sending, by the rApp, the instantiation policy via an R1 interface to the ORMOS; based on the instantiation policy, requesting, by the ORMOS, an instantiation implementation of the determined one or more NFs via an O2 interface to at least one O-Cloud management service; upon receiving the implementation request, instantiating, by the at least one O-Cloud management service, one or more NFs on the one or more other O-Cloud nodes according to the implementation request, wherein the at least one O-Cloud management service may include deployment management services (DMS) and infrastructure management services (IMS); sending, by the at least one O-Cloud management service, a registration and configuration request for the instantiated one or more NFs to NF-related radio access network (RAN) Operations, Administration and Maintenance (OAM) Services; based on the registration and configuration request, sending, by the NF-related RAN OAM Services, a configuration notice for the instantiated one or more NFs to the ORMOS; and sending, by the ORMOS, instructions to finalize the instantiation implementation of the determined one or more NFs to the at least one O-Cloud management service.

According to an embodiment, a non-transitory computer-readable recording medium having recorded thereon instructions executable by at least one processor configured to perform a method that includes: determining, by an rApp within a service management orchestration framework (SMO), one or more network functions (NFs) hosted on at least one O-Cloud node to be instantiated on one or more other O-Cloud nodes; creating, by the rApp, an instantiation policy for the determined one or more NFs for the O-Cloud Resource Management and Orchestration Services (ORMOS), wherein the ORMOS may include a Network Function Orchestrator (NFO) and a Federated O-Cloud Orchestration and Management (FOCOM); sending, by the rApp, the instantiation policy via an R1 interface to the ORMOS; based on the instantiation policy, requesting, by the ORMOS, an instantiation implementation of the determined one or more NFs via an O2 interface to at least one O-Cloud management service; upon receiving the implementation request, instantiating, by the at least one O-Cloud management service, one or more NFs on the one or more other O-Cloud nodes according to the implementation request, wherein the at least one O-Cloud management service may include deployment management services (DMS) and infrastructure management services (IMS); sending, by the at least one O-Cloud management service, a registration and configuration request for the instantiated one or more NFs to NF-related radio access network (RAN) Operations, Administration and Maintenance (OAM) Services; based on the registration and configuration request, sending, by the NF-related RAN OAM Services, a configuration notice for the instantiated one or more NFs to the ORMOS; and sending, by the ORMOS, instructions to finalize the instantiation implementation of the determined one or more NFs to the at least one O-Cloud management service.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 6 illustrates a flowchart of a method for creating one or more NFs on one or more other O-Cloud nodes, for each of the created one or more NFs according to another embodiment;

FIG. 7 illustrates a flowchart of a method for finalizing the instantiation implementation of the determined one or more NFs according to another embodiment;

FIG. 8 illustrates a flowchart of a method for implementing the termination of the determined one or more NFs according to another embodiment;

FIG. 9 illustrates a flowchart of a method for sending feedback to the termination of the determined one or more NFs to the ORMOS according to another embodiment;

DETAILED DESCRIPTION

The following detailed description of exemplary embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 2:
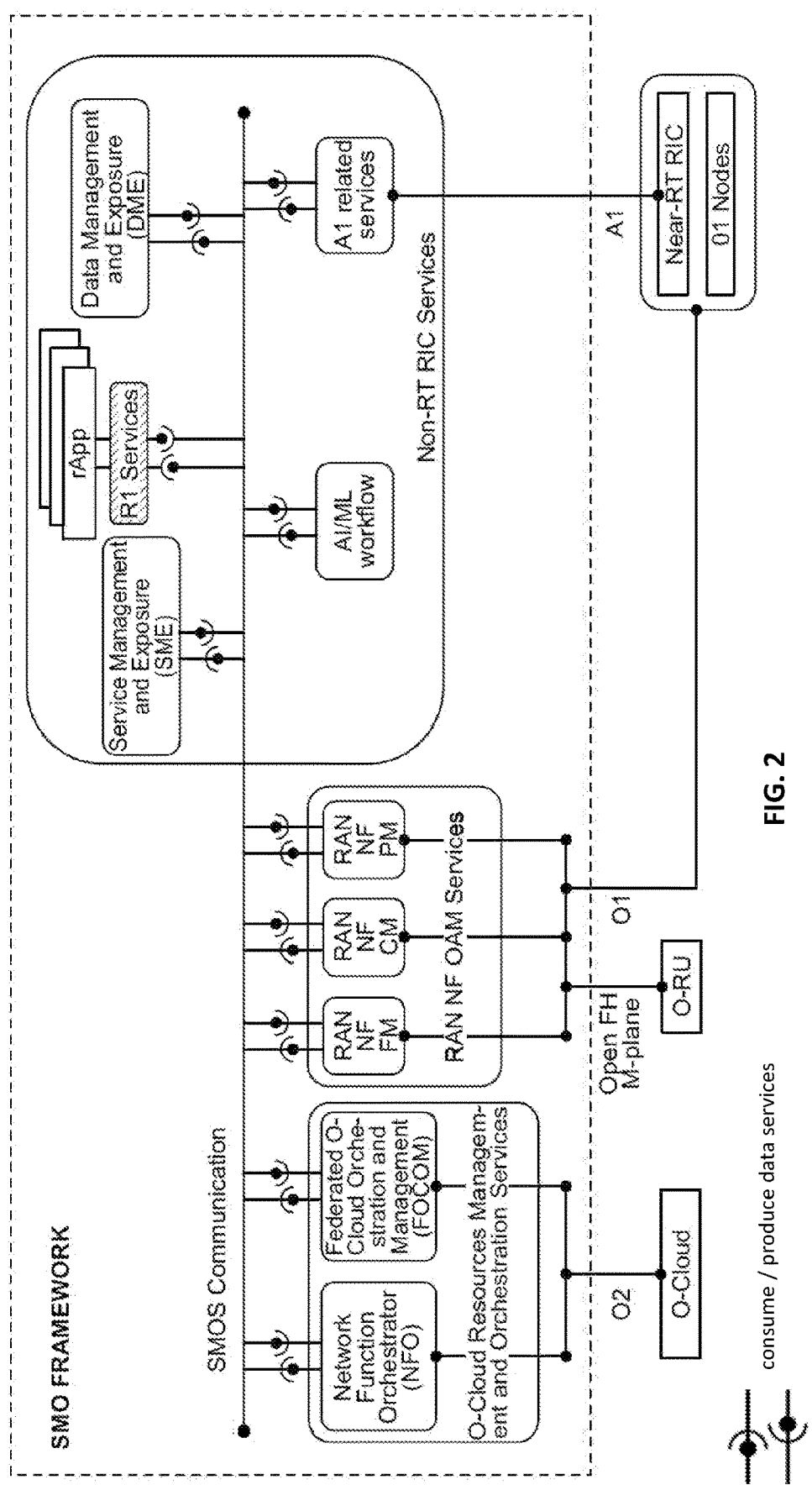
FIG. 2 illustrates an SMO framework architecture for implementing a policy-based framework for O-Cloud Resource Management and Orchestration Services according to one or more example embodiments.

FIG. 2 illustrates an SMO framework architecture for implementing a policy-based framework for O-Cloud Resource Management and Orchestration Services according to one or more example embodiments. In particular, FIG. 2 illustrates an NRT-RIC framework (or platform), one or more rApps hosted by the NRT-RIC with regard to an R1 interface within the SMO framework system architecture and O1, O2, A1 interfaces within an O-RAN to implement an R1 policy-based framework for O-Cloud Resource Management and Orchestration Services according to one or more example embodiments.

Referring to FIG. 2, the NRT-RIC represents a subset of functionalities of the SMO framework. The NRT-RIC can access other SMO framework functionalities and thereby influence (i.e., controls and/or executes) what is carried across the O1 and O2 interface (e.g., performing fault management (FM), configuration management (CM), and/or performance management (PM)).

The NRT-RIC includes an NRT-RIC framework. The NRT-RIC framework, among a plurality of other functions, includes R1 service exposure functions (e.g., Service Management & Exposure (SME) functions, Data Management & Exposure (DME) functions, AI/ML Workflow functions, A1-related services functions, etc.) that handle R1 services. For example, R1 services and related service procedures may include R1-Service Management & Exposure (SME) services, R1-Data Management & Exposure (DME) services, R1-A1 services, R1-O1 Data services, R1-O2 Data services, R1-AI/ML services, etc.). Among those R1-services, for example, the DME services deliver data created or collected by data producers (e.g., a RAN NF operations, administration and maintenance (OAM) services within SMO framework) to data consumers (e.g., rApps) according to their needs (e.g., fault management (FM), consumption management (CM), production management (PM)).

To this end, the NRT-RIC framework produces and/or consumes the R1 services, wherein rApps are applications that leverage the functionalities available in the NRT-RIC framework and/or SMO framework to provide value-added services related to RAN operation and optimization. The scope of rApps includes, but is not limited to, radio resource management, data analytics, etc., and enrichment of information.

Within the NRT-RIC framework, the rApps communicate with the SMO functions via an R1 interface. The R1 interface is an open logical interface within the O-RAN architecture between the rApps and the NRT-RIC framework of the NRT-RIC. The R1 interface supports the exchange of control signaling information and the collection and delivery of data between endpoints (e.g., the rApps and one or more NFs or one or more O-Cloud nodes hosting the NFs).

Moreover, the R1 interface is independent of specific SMO and NRT-RIC framework implementations. The R1 interface is defined in an extensible way that enables new services and data types to be added without needing to change protocols or procedures (e.g., standardized protocols or procedures). In particular, the R1 interface facilitates the interconnection between rApps and the NRT-RIC framework supplied by different vendors (i.e., facilitates interconnection in a multi-vendor environment). To this end, the R1 interface provides a level of abstraction between the rApps and NRT-RIC framework and/or SMO framework (e.g., the NFO and/or the FOCOM).

Still referring to FIG. 2, the NRT-RIC framework comprises A1-related functions. The A1-related functions communicate via the O1 interface and the A1 interface to nRT-RIC and O1 nodes (i.e., NFs such as VNF(s) and/or CNF(s) implementing O-CU, O-DU, etc.) The A1-related functions of the NRT-RIC framework support, for example, A1 logical termination, A1-policy coordination and catalog, A1-EI coordination and catalog, etc.

Moreover, within the NRT-RIC framework, the AI/ML workflow services provide access to AI/ML workflow processing. For example, the AI/ML workflow services may assist in training models, monitoring, etc. the deployed AI/ML models in NRT-RIC.

The NRT-RIC framework (e.g., the rApp) communicates (e.g., consumes or subscribes) to a plurality of SMO framework services (e.g., the SMO communicates with the NRT-RIC via an A2 interface).

For example, among others but not limited to NFs related RAN OAM Services (i.e., RAN NF OAM Services) that collect and (i.e., produce) OAM-related data such as fault management (FM), consumption management (CM), production management (PM), etc. from the nRT-RIC and/or O1 nodes (i.e., network NFs such as VNF(s) and/or CNF(s)

implementing O-CU, O-DU, etc.). In an example embodiment, the OAM-related data (i.e., the data of NF-related OAM Services) are collected via the O1 interface. Alternatively, the OAM-related data may be collected via an FH M-plane interface from an O-RU.

Moreover, the NRT-RIC framework (e.g., the rApp) communicates (e.g., consumes or subscribes) to a plurality of O-Cloud Resource Management and Orchestration Services within the SMO framework. For example, among others but not limited to the SMO may include a Network Function Orchestrator (NFO), a Federated O-Cloud Orchestration and Management (FOCOM), etc., that manages Virtual Machines (VM) based Virtual Network Functions (VNF) and/or could native network functions (CNF) and container (i.e., instance) based VNF and/or CNF.

In an example embodiment, the O-Cloud Resource Management and Orchestration Services (ORMOS) may comprise services within the SMO framework that communicate via an A2 interface with the NRT-RIC.

Figure 1:
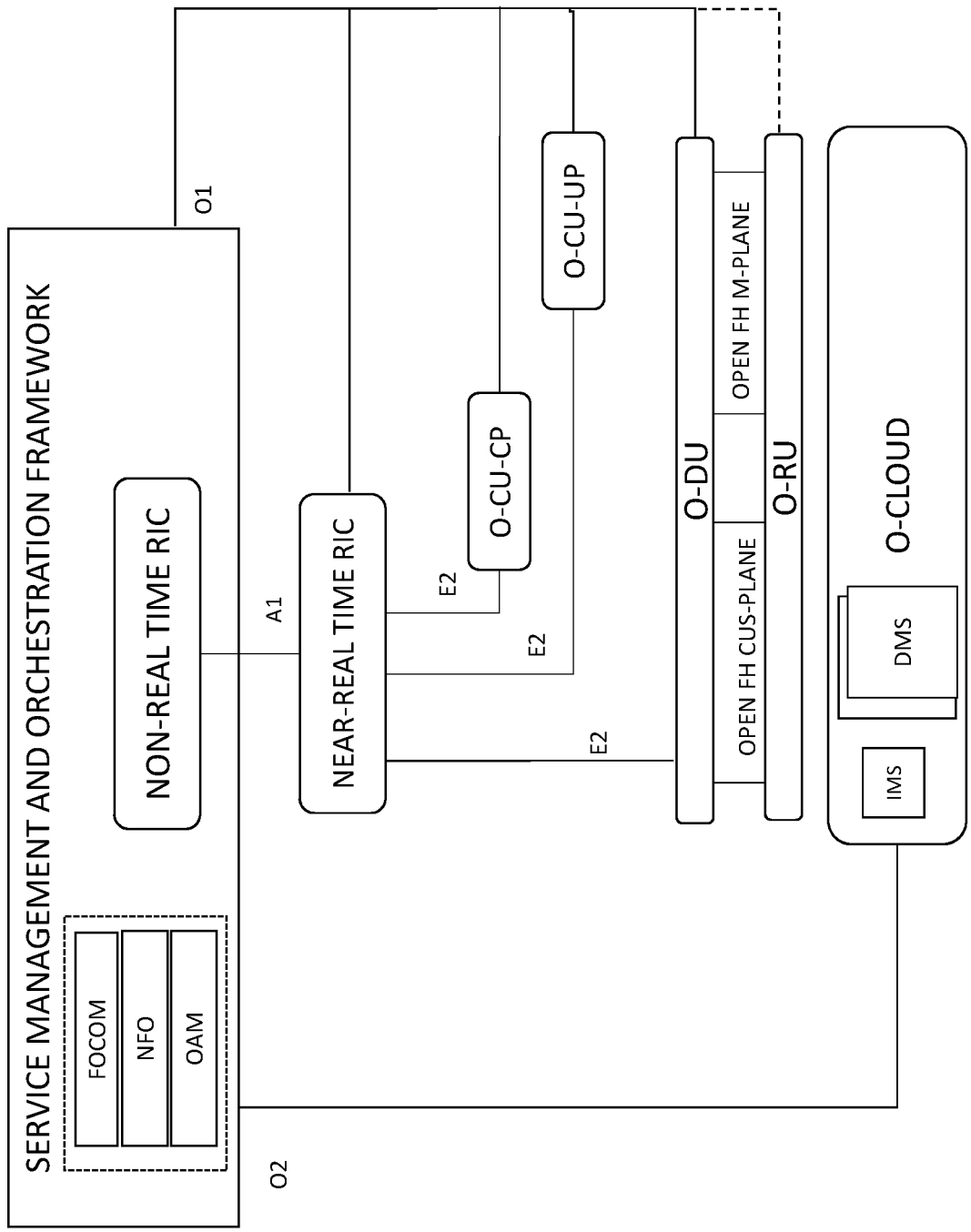
FIG. 1 illustrates an O-RAN architecture according to the related art.

In an example embodiment, the O-Cloud Resource Management and Orchestration Services (ORMOS) (i.e., NFO/FOCOM) may be an O2-related function that communicates via the O2 interface with O-Cloud management services such as the DMS and/or IMS as outlined in FIG. 1. Moreover, in an example embodiment, the NFO and the FOCOM may communicate based on a common policy (R1-policy).

In order to allow the ORMOS capabilities for implementing a policy-based framework (i.e., an R1 policy-based framework), the ORMOS can be exposed to SME data, receiving and translating (e.g. analyzing, interpreting, evaluating, etc.) policies and actions for the O-Cloud infrastructure over O2-related interfaces, receiving actions from rApps and implementing said actions for the O-Cloud infrastructure over O2 interface, etc., wherein the NFO and the FOCOM must define services offered by NFO/FOCOM over R1 interface to be consumed by the rApps.

To this end, for the implementation of an R1 policy-based framework, a specification of the R1 application protocol may comprise service descriptions, service procedures, resource (e.g., O-Cloud hardware-related resource) definitions, Application Programming Interface (API) definitions for a variety of R1 services (e.g., R1 services to be produced/consumed by rApps) for the implementation of an R1 policy-based framework. Moreover, the R1 interface may be defined to comprise a specification of particular R1 interface types such as data models and data types to implement the R1 policy-based framework for the ORMOS. The definition of said particular R1 interface types allow the rApp with the NRT-RIC framework to push policies/changes to the NFO/FOCOM via the R1 interface.

To this end, at the ORMOS side, in an example embodiment, the FOCOM may comprise (Fault, Configuration, Accounting, Performance, and Security) FCAPS-related services, wherein FCAPS services comprise O2-related IMS FCAPS services such as, for example, performance management (PM) services such as O-Cloud infrastructure monitoring services that can provide O-Cloud infrastructure telemetry data to monitor the health of the O-Cloud Infrastructure components (e.g., the O-Cloud servers) and can provide the status of network operations (e.g., provide O2-related data provide the performance, capacity, deployment status (i.e., number of NFs deployed on the O-Cloud) and resource utilization of the O-Cloud infrastructure.

Moreover, according to another example embodiment, the FOCOM FCAPS-related services may comprise fault management (FM) services that include fault reporting related to the O-Cloud infrastructure.

In addition, according to another example embodiment, the FOCOM FCAPS services may include configuration management (CM) services that include at least one reporting service for O-cloud infrastructure configuration schemas (e.g., O-Cloud-related hardware inventories) and at least one provisioning service that modifies the O-Cloud-related hardware inventories in the context of (related to) infrastructure lifecycle management.

According to the FOCOM FCAPS as set forth above the ORMOS (i.e., the FOCOM) may request information (e.g., O2-related data) related to O-Cloud infrastructure management services (IMS) from the IMS. The information (e.g., O2-related data) may be provided by at least one of an O-Cloud IMS, such as, for example, an O-Cloud IMS performance measurement service, an infrastructure inventory service, an infrastructure monitoring service, a data infrastructure provisioning service, an infrastructure lifecycle management service, an infrastructure software management service, etc.

Still referring to the ORMOS, in an example embodiment, the NFO may comprise (Fault, Configuration, Accounting, Performance, and Security) FCAPS-related services, wherein FCAPS services comprise O2-related DMS FCAPS services such as information related to O-Cloud deployment management services (DMS) such as, for example, deployment inventory services, deployment monitoring services, deployment lifecycle management services, etc.

Alternatively, the ORMOS may collect (i.e., produce or subscribe to) O-Cloud-related performance data via other O-Cloud infrastructure performance-related information channels (e.g., external services).

In an example embodiment, the rApp may collect data referring to utilization patterns of at least one O-Cloud node and/or one or more NFs hosted thereon via a plurality of interfaces (i.e., via various subscriptions to services that produce, for example, utilization pattern-related data via various information channels), for example, at least one of an A1-interface, an A2-interface, an O1 interface (e.g., including 3GPP interfaces such E1, F1, etc.), an O2 interface, an FH M-Plane interface, etc.

Figure 3:
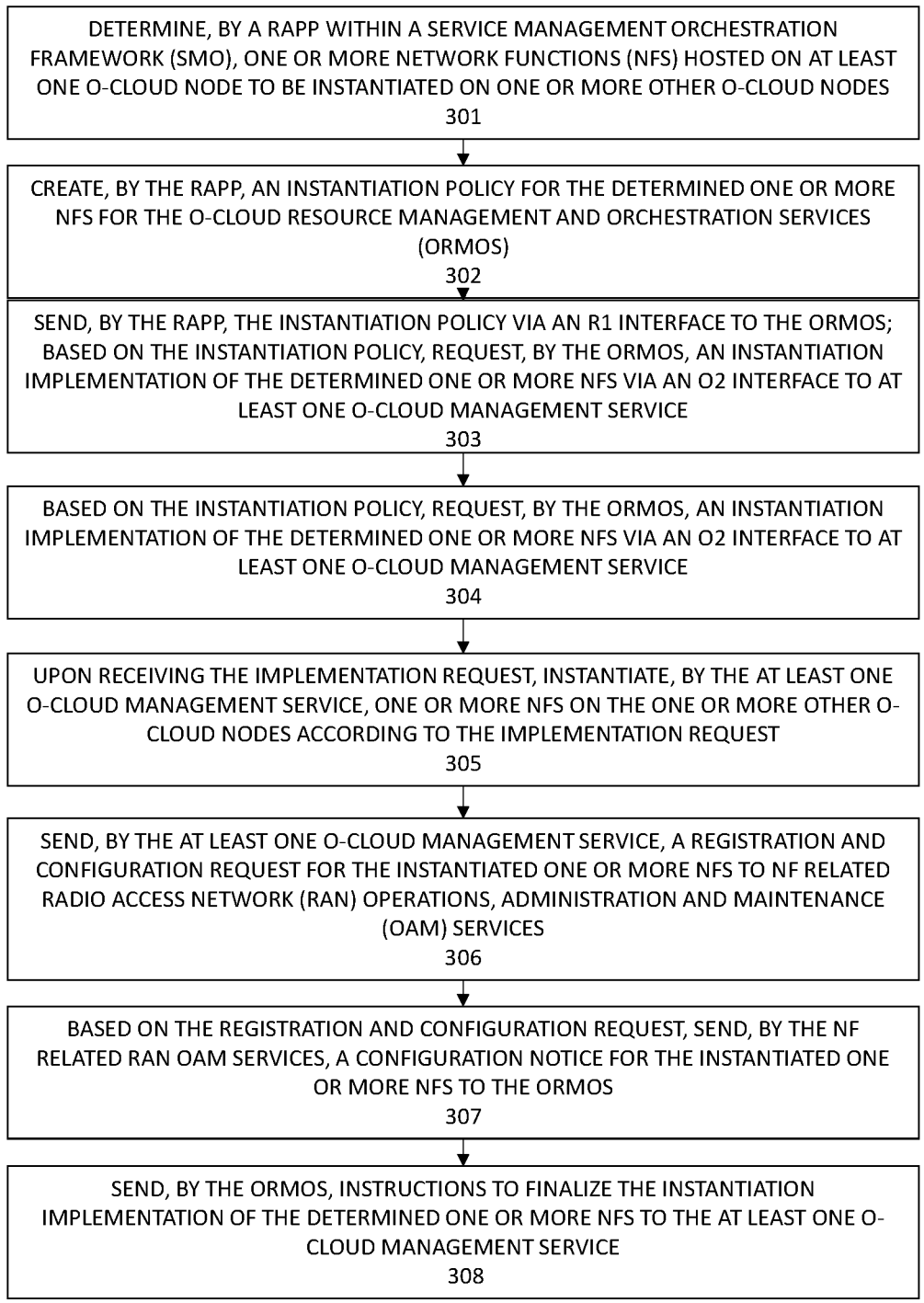
FIG. 3 illustrates a flowchart of a method for implementing a policy-based framework for O-Cloud Resource Management and Orchestration Services in a telecommunications network according to an embodiment.

FIG. 3 illustrates a flowchart of a method for implementing a policy-based framework for O-Cloud Resource Management and Orchestration Services in a telecommunications network according to an embodiment.

Referring to FIG. 3, in step 301 the rApp within a service management orchestration framework (SMO) (i.e., within the NRT-RIC framework of the SMO framework) determines one or more network functions (NFs) hosted on at least one O-Cloud node to be instantiated on one or more other O-Cloud nodes.

Referring to step 301, the determination of whether to instantiate one or more NFs on one or more other O-Cloud nodes within the O-Cloud may be triggered, for example, in case a tenant operator of the telecommunication network (i.e., the RAN) sends an updated service-level agreement (SLA) that defines the level of service expected by the tenant operator from a telecommunication network provider (i.e., a host operator).

Alternatively, the instantiation may be triggered by a degradation of the NF performance on the O-Cloud nodes, changes to the O-Cloud node inventory and/or RAN resources, and/or changing the level of service metrics within the RAN, etc., wherein an R1 policy is created to resolve the deviation between the current (inferior or outdated) status and the intended (planned, updated, etc. or targeted) status.

According to an example embodiment, a tenant operator RAN sharing rApp may send the updated service-level agreement (SLA) to a host operator RAN sharing rApp (i.e., the RAN sharing rApp of the host operator).

In this case, the rApp receives the metrics laying out a level of service of an updated SLA from tenant operator RAN sharing rApp. The level of service is laying out the metrics by which the service is measured (e.g., the O1-related key performance indicators (KPIs), O2-related KPIs, etc.). Upon receiving, the rApp analyzes the metrics laying out the level of service of the updated SLA. The analysis of the SLA comprises interpreting in terms of O-Cloud Infrastructure requirements such as CPU, storage, memory, bandwidth (BW), etc.

Upon analyzing, the rApp collects O1-related performance data for predicting expected RAN resources from the NF-related RAN OAM Services and O2-related telemetry data of O-Cloud nodes from at least one O-Cloud management service (e.g., IMS and/or DMS).

For example, the host operator RAN sharing rApp may collect (i.e., consumes or subscribes to services that provide) data referring to utilization patterns of at least one O-Cloud node and/or one or more NFs hosted thereon (e.g., the rApp may retrieve telemetric data from at least one of the interface as outlined in FIGS. 1 and 2.

For example, the host operator RAN sharing rApp may collect data (e.g., performance data, KPI data, etc.) referring to utilization patterns from, for example, an NF-related radio access network (RAN) Operations, Administration and Maintenance (OAM) Services, an O-Cloud Resource Management and Orchestration Services (ORMOS) and/or at least one O-Cloud management service (e.g., IMS and/or DMS) as set forth in FIGS. 1 and 2.

For example, the data (e.g., performance data, KPI data, etc.) referring to utilization patterns comprise O2-related data such as IMS and/or DMS telemetry data, inventory data, etc. Moreover, the host operator RAN sharing rApp may collect O1-related data (e.g., performance data, KPI data, etc.) such as, for example, traffic data and/or user density data for predicting expected O-Cloud resources to fulfill, for example, the updated SLA level of service as expected from the tenant operator.

The rApp, based on the collected data, then evaluates the required RAN resources to be reconfigured for the instantiation of one or more NFs on the O-Cloud node inventory. Upon the evaluation, the rApp determines one or more NFs to be instantiated on one or more other O-Cloud nodes. For example, the rApp analyses and evaluates the existing (i.e., available)O-Cloud inventory and identifies target nodes (i.e., one or more O-Cloud nodes) for creation (i.e., instantiation) of NFs (e.g., the deployment CNFs) with updated resources (i.e., reconfigured O-Cloud nodes).

Still referring to FIG. 3, in step 302, the rApp creates an instantiation policy (i.e., an R1 policy) for the determined one or more NFs for the O-Cloud Resource Management and Orchestration Services (ORMOS). For example, the ORMOS include a Network Function Orchestrator (NFO) and a Federated O-Cloud Orchestration and Management (FOCOM).

In an example embodiment, the rApp may consume data referring to utilization patterns produced by O2-related services via the O-Cloud DMS and inputs the data to the AI/ML model. In this case, at least one AI/ML model algorithm may identify one or more NFs hosted on the at least O-Cloud node (e.g., one or more virtual machines (VM) based virtual network functions (VNF) and container (i.e., instance) based cloud-native network functions (CNFs)).

In this case, the input data refer to utilization patterns produced by at least one of a deployment inventory service, a deployment monitoring service, a deployment lifecycle management service, etc. Furthermore, the input data refer to utilization patterns produced by DMS services to provision changes in the configuration of the O-Cloud and services to obtain additional information related to the O-Cloud.

In another example embodiment, the rApp may consume utilization patterns produced by O2-related services via the O-Cloud IMS. In this case, at least one AI/ML model algorithm may identify at least one physical host (e.g., hardware infrastructure such as servers, server clusters, etc.) in the O-Cloud infrastructure within the O-RAN architecture according to FIGS. 1 and 2 via the O2 interface. In this case, the input data refer to utilization patterns produced by an infrastructure inventory service, an infrastructure monitoring service, an infrastructure provisioning service, an infrastructure lifecycle management service, an infrastructure software management service, etc.

In an example embodiment, the rApp, to create an instantiation policy may consume data referring to utilization patterns produced by O2-related services via the NFO FCAPS relating to O-Cloud DMS or via the FOCOM FCAPS relating to O-Cloud IMS as set forth in FIG. 2.

The instantiation policy (i.e., the R1 policy) may guide and identify one or more NFs hosted on at least an O-Cloud node (e.g., one or more virtual machines (VM) based virtual network functions (VNF) and container (i.e., instance) based cloud-native network functions (CNFs)).

To this end, the capabilities of the NFO and FOCOM regarding the establishment of the R1 interface-based communication for implementing an R1 policy framework for the ORMOS provide information to determine one or more NFs in step 302.

Moreover, the instantiation policy (i.e., the R1 policy) may guide to one of the following scenarios: the instantiation of NFs due to updated SLAs of tenant operators as set forth above, based NF performance degradation on the O-Cloud inventory, based on changes in RAN resources and/or O-Cloud inventory, based on level of service demand within the telecommunication network, etc.

In step 303, the rApp sends the instantiation policy via an R1 interface to the ORMOS. For example, according to the SMO's communication as illustrated in FIG. 2, the rApp sends the instantiation policy via the R1 interface within the NRT-RIC framework to the ORMOS.

To this end, for the implementation of an R1 policy-based framework, the specification of the R1 application protocol includes at least of service descriptions, service procedures, resources (e.g., O-Cloud hardware-related resources) definitions, and API definitions for the variety of R1 services (e.g., rApps), etc. Moreover, the R1 interface for an R1 policy-based framework for the ORMOS defines a specification to include at least one particular R1 interface type including one or more data models and one or more data types to implement the R1 policy-based framework for the ORMOS. particular R1 interface types allow the rApp within the NRT-RIC framework to communicate (e.g., push) policies/changes to the NFO/FOCOM via the R1 interface.

Furthermore, as set forth in FIG. 2, the FOCOM and the NFO have to capability to communicate with rApps via the R1 interface (i.e., data exposure to rApps), to receive R1 policies and actions from the rApps, and to interact (i.e., establish an interaction between FOCOM and NFO related services), etc. to implement the policies and actions in the O-Cloud infrastructure via the O2 interface.

In step 304, the ORMOS, based on the instantiation policy, request an instantiation implementation of the determined one or more NFs via an O2 interface to at least one O-Cloud management service. For example, the instantiation implementation request may send via the O2 interface to at least one O-Cloud management service comprising deployment management services (DMS) and infrastructure management services (IMS).

In step 305, upon receiving the implementation request, the least one O-Cloud management service instantiates one or more NFs on one or more other O-Cloud nodes according to the implementation request.

In an example embodiment, during the instantiation, the DMS and IMS may communicate with the NFO and FOCOM, respectively (e.g., the DMS communicates with the NFO and the IMS communicates with the FOCOM).

For example, when instantiating one or more NFs on at least one O-Cloud node according to the implementation request, the NFO, based on the received instantiation policy, sends the implementation request to deploy the determined one or more NFs on the one or more other O-Cloud nodes in accordance with the received instantiation policy to the DMS. Upon receipt of the deployment instructions, the DMS may create one or more NFs on the other one or more O-Cloud nodes.

To this end, the NFO FCAPS services provide O2-related DMS services including at least one of a deployment inventory service, a deployment monitoring service, and a deployment lifecycle management service.

In step 306, at least one O-Cloud management service sends a registration and configuration request for the instantiated one or more NFs to NF-related radio access network (RAN) Operations, Administration and Maintenance (OAM) Services.

In step 307, based on the registration and configuration request, the NF-related RAN OAM Services send a configuration notice for the instantiated one or more NFs to the ORMOS.

In step 308, the ORMOS send instructions to finalize the instantiation implementation of the determined one or more NFs to the at least one O-Cloud management service.

For example, when finalizing the instantiation implementation of the determined one or more NFs at least one O-Cloud management service (IMS/DMS) implements the termination of the determined one or more NFs on at least one O-Cloud node.

According to an example embodiment, when implementing the termination of the determined one or more NFs, the NFO may send a request to terminate the determined one or more NFs on at least one O-Cloud to the DMS. The DMS, upon the termination of the determined one or more NFs, may send a termination confirmation notice. Upon receipt, the NFO may send a termination confirmation notice to the FOCOM. Based on the termination confirmation notice, the FOCOM may send an implementation request for unloading at least one O-Cloud node hosting the terminated one or more NFs to the IMS.

To this end, the FOCOM FCAPS services provide O2-related IMS services including at least one of an O-Cloud IMS performance measurement service, infrastructure inventory service, infrastructure monitoring service, data infrastructure provisioning service, infrastructure lifecycle management service, and infrastructure software management service.

Based implementation request for unloading at least one O-Cloud node hosting the terminated one or more NFs, the IMS may instruct the draining and/or cordoning of the at least one O-Cloud node.

Moreover, according to an example embodiment, when finalizing the instantiation implementation of the determined one or more NFs, upon implementing the termination of the determined one or more NFs on the at least one O-Cloud node, the at least one O-Cloud management service sends feedback to the termination of the determined one or more NFs on the at least one O-Cloud node to the ORMOS.

Referring to FIG. 3, the method for implementing the policy-based framework for the ORMOS has the advantage to provide the ORMOS with guidance on how to instantiate NFs (i.e., VNFs and/or CNFs) based on multiple scenarios that may include, among other scenarios, the effective implementation of an SLA change and the energy-efficient and, in an O-Cloud, resource-optimized operation according to the metrics as defined in the SLA, without performance degradation of the NFs and/or the O-Cloud nodes. This enables an optimal (e.g., energy-efficient, resource-optimized, resilience-optimized, etc.) operational performance of the O-RAN.

Figure 4:
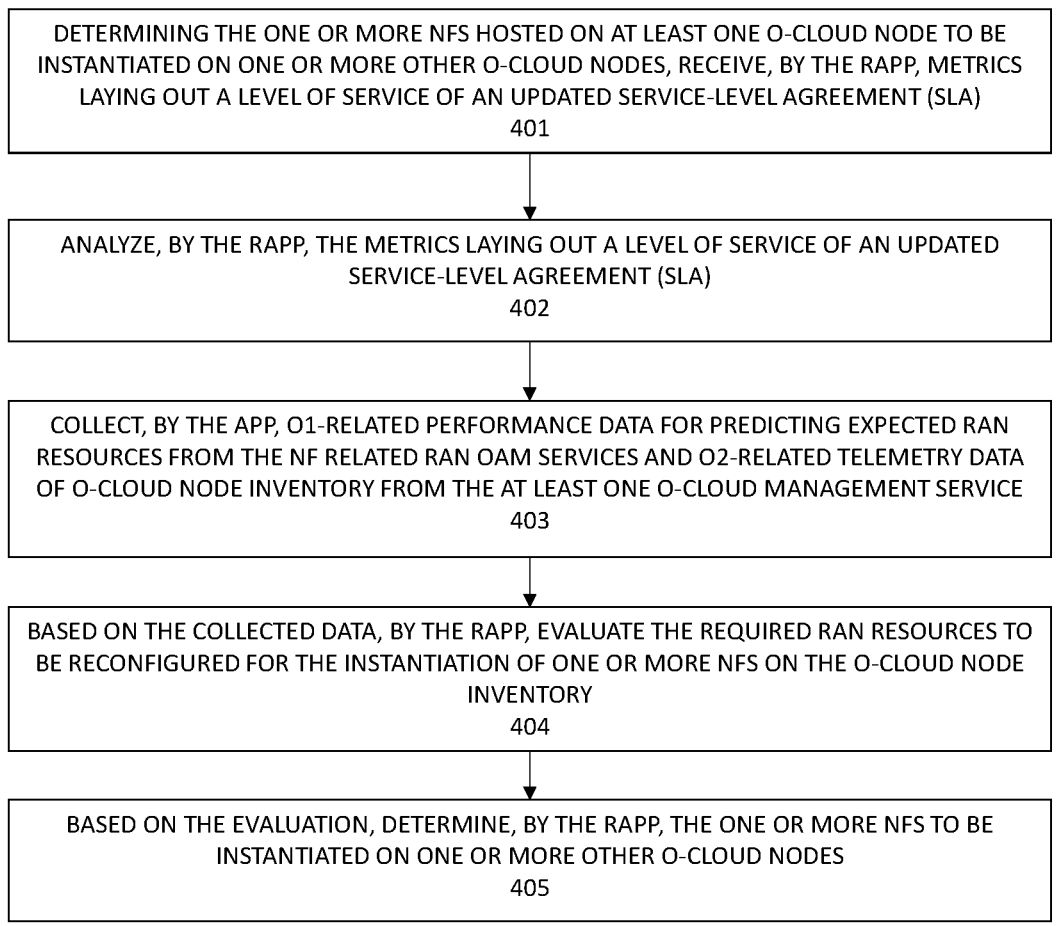
FIG. 4 illustrates a flowchart of a method for determining the one or more NFs hosted on at least one O-Cloud node to be instantiated on one or more other O-Cloud nodes according to another embodiment.

FIG. 4 illustrates a flowchart of a method for determining the one or more NFs hosted on at least one O-Cloud node to be instantiated on one or more other O-Cloud nodes according to another embodiment.

Referring to FIG. 4, in step 401, the rApp receives metrics laying out a level of service of an updated service-level agreement (SLA).

In step 402, the rApp analyzes the metrics laying out a level of service of an updated service-level agreement (SLA).

In step 403, the rApp collects O1-related performance data for predicting expected RAN resources from the NF-related RAN OAM Services and O2-related telemetry data of O-Cloud node inventory from at least one O-Cloud management service.

In step 404, the rApp, based on the collected data, evaluates the required RAN resources to be reconfigured for the instantiation of one or more NFs on the O-Cloud node inventory.

In step 405, the rApp, based on the evaluation, determines one or more NFs to be instantiated on one or more other O-Cloud nodes.

Referring to FIG. 4, the method for determining the one or more NFs hosted on at least one O-Cloud node to be instantiated on one or more other O-Cloud nodes allows for the collection of O1-related performance data for predicting expected RAN resources and O2-related telemetry data of O-Cloud node inventory. This enables the rApp to create accurate policies for the ORMOS that consider the actual RAN operation status (e.g., the traffic load, user number, etc. of the NFs and the impact of NF outages to other NFs as well as the resource status of the O-Cloud node inventory hosting the NFs. This has the advantage that an optimal policy for the envisaged operation scenario, for example, for a level-of-service change due to an SLA update in the RAN can be created by the rApp.

Figure 5:
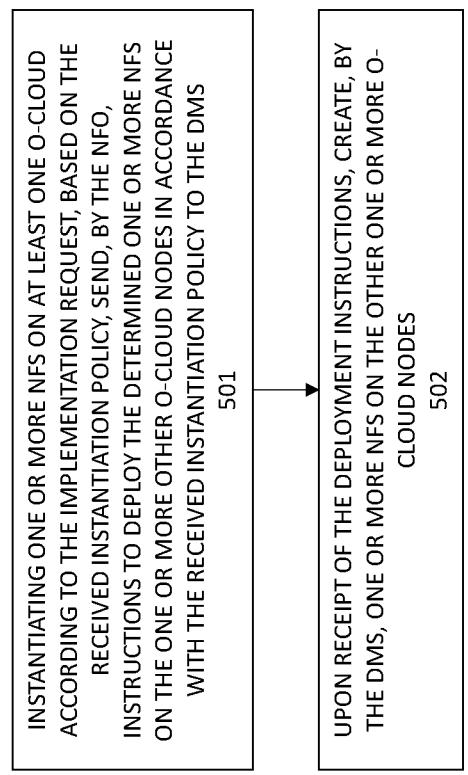
FIG. 5 illustrates a flowchart of a method for instantiating one or more NFs on at least one O-Cloud according to the implementation request according to another embodiment.

FIG. 5 illustrates a flowchart of a method for instantiating one or more NFs on at least one O-Cloud according to the implementation request according to another embodiment. Referring to FIG. 5, wherein when instantiating one or more NFs on at least one O-Cloud according to the implementation request, in step 501, the NFO sends instructions to deploy the determined one or more NFs on the one or more other O-Cloud nodes in accordance with the received instantiation policy to the DMS.

In step 502, the DMS, upon receipt of the deployment instructions, creates (i.e., deploys, instantiates) one or more NFs (e.g., CNFs) on the other one or more O-Cloud nodes.

For example, when creating (i.e., deploys, instantiates) one or more NFs (e.g., CNFs) on the other one or more O-Cloud nodes, the NFO via the DMS may perform a sanity and health check on the new NF, for example, based on at least one O-Cloud-related data (e.g., telemetry data) received over the O2 interface and/or O-RAN-related data (e.g., telemetry data) received over an O1 interface (i.e., the O1 related data may be available after registration and configuration of the new NFs at the NF-related RAN OAM Services according to step 306 of FIG. 3 or FIG. 6).

FIG. 6 illustrates a flowchart of a method for creating one or more NFs on one or more other O-Cloud nodes, for each of the created one or more NFs according to another embodiment.

Referring to FIG. 6, when creating one or more NFs on one or more other O-Cloud nodes, for each of the created one or more NFs, in step 601, each of the created one or more NFs sends an NF registration and configuration request to the NF-related RAN OAM Services.

In step 602, the NF-related RAN OAM Services, upon receipt of the NF registration and configuration request, registers and configures each of the created one or more NFs.

In step 603, the NF-related RAN OAM Services sends a configuration confirmation notice for each of the created one or more NFs to the NFO.

For example, upon finalizing the sanity and health check on the new NF based on the configuration confirmation notice for each of the created one or more NFs to the NFO. The NFO may determine that sanity and health check on the new NF is successful. For example, the NFO runs a check of the performance of the NF and the hardware resources of the O-Cloud node hosting the NF within the O-RAN. To this end, the NFO instructs the DMS to divert the traffic from the NF to be migrated to the new NF, and when the NFO via the DMS determines that all traffic from the NF to be migrated is diverted to the new NF, the NFO may communicate with the FOCOM, wherein the FOCOM prepares to drain the O-Cloud node (i.e., to unload the O-Cloud node).

Referring to FIG. 6, the configuration confirmation notice for each of the created one or more NFs to the NFO enables the NFO to communicate the information about the registration and confirmation of the NF-related RAN OAM Services to the FOCOM. This allows the information to be communicated to the IMS and a round-robin exchange of information between the NFO, DMS, FOMO, and IMS to implement a common policy. As a result, the R1 policy-based framework can be effectively implemented for ORMOS.

FIG. 7 illustrates a flowchart of a method for finalizing the instantiation implementation of the determined one or more NFs according to another embodiment. Referring to FIG. 7, when finalizing the instantiation implementation of the determined one or more NFs, in step 701, at least one O-Cloud management service implements the termination of the determined one or more NFs on the at least one O-Cloud node.

In step 702, at least one O-Cloud management service sends feedback to the termination of the determined one or more NFs on the at least one O-Cloud node to the ORMOS.

Referring to FIG. 7, the feedback of the termination of the determined one or more NFs on the at least one O-Cloud node to the ORMOS perform a sanity and health check on the new NF, for example, based on O-RAN-related (KPI) data (e.g., telemetry data) received over the O1 interface that includes the registration and configuration of the new NFs from the NF-related RAN OA to optimize the efficiency of NF deployment (instantiation) on O-Cloud nodes for optimal RAN operation.

FIG. 8 illustrates a flowchart of a method for implementing the termination of the determined one or more NFs according to another embodiment. Referring to FIG. 8, when implementing the termination of the determined one or more NFs, in step 801, the NFO sends a request to terminate the determined one or more NFs on at least one O-Cloud to the DMS.

In step 802, the DMS, upon the termination of the determined one or more NFs, sends a termination confirmation notice. Similar to the embodiment described above with reference to FIG. 6, the DMS diverts all traffic at this time and sends a termination confirmation notice.

In step 803, the NFO sends a termination confirmation notice to the FOCOM.

In step 804, the FOCOM, based on the termination confirmation notice of the NFO, sends an implementation request for unloading at least one O-Cloud node to the IMS.

For example, the FOCOM prepares to drain and cordon the O-Cloud node that hosted the old NFs.

To this end, the FOCOM FCAPS services provide O2-related IMS services including at least one of an O-Cloud IMS performance measurement service, infrastructure inventory service, infrastructure monitoring service, data infrastructure provisioning service, infrastructure lifecycle management service, and infrastructure software management service.

In step 805, the IMS, upon receiving the implementation request for unloading, instructs the draining and/or cordoning of the at least one O-Cloud node.

For example, the FOCOM based on the termination confirmation notice from the NFO, determines that all traffic from the NF to be migrated is diverted to the new NF. The IMS drains and/or cordons the at least one O-Cloud node and notifies the FOCOM that the instantiation of the NF is completed (e.g., the new CNFs are running on new O-Cloud nodes and the O-Cloud nodes that hosted the old CNFs are drained and cordoned). To this end, the FOCOM FCAPS also provides feedback about the inventory status to the rApp.

Referring to FIG. 8, the interaction between the NFO and the FOCOM (e.g., between the NFO, DMS, FOMO, and IMS to implement a common policy) has the advantage that the R1 policy-based framework can be effectively implemented for the ORMOS to optimize the efficiency of NF deployment (instantiation) on O-Cloud nodes for optimal RAN operation.

FIG. 9 illustrates a flowchart of a method for sending feedback to the termination of the determined one or more NFs to the ORMOS according to another embodiment.

Referring to FIG. 9, when sending feedback to the termination of the determined one or more NFs to the ORMOS, in step 901, the IMS, upon unloading the at least one O-Cloud node, sends an unloading confirmation notice to the FOCOM.

In step 902, the FOCOM, based on the unloading confirmation, sends instantiation policy feedback to the rApp.

In an example embodiment, the feedback based on either data received from the ORMOS (e.g., the FOCOM) or due to an update of the deployment inventory of the O-Cloud based on a reconfigured O-Cloud nodes and/or one or more NFs hosted thereon after deployment (e.g., after an instantiation) (i.e., feedback that is based on the O-Cloud IMS service data referring to at least one O-Cloud node after an inventory update).

Based on the feedback in an example embodiment, the rApp may apply an AI/ML model (e.g., a reinforcement learning model configured to update the data referring to R1 policy-based on the feedback to the rApp, wherein the feedback comprises at least one of O-Cloud node related data received over the O2 interface (and/or NF-related data received over an O1 interface).

Referring to FIG. 9, the closed-loop control operation of updating the data related to the R1 policies based on the feedback to the rApp has the advantage of being able to optimize instantiation (deployment) of NFs based on different trigger scenarios (e.g., RAN operation scenarios such as SLA update, environment change, infrastructure change, behavioral use change, etc.) as defined by different R1 policies.

Figure 10:
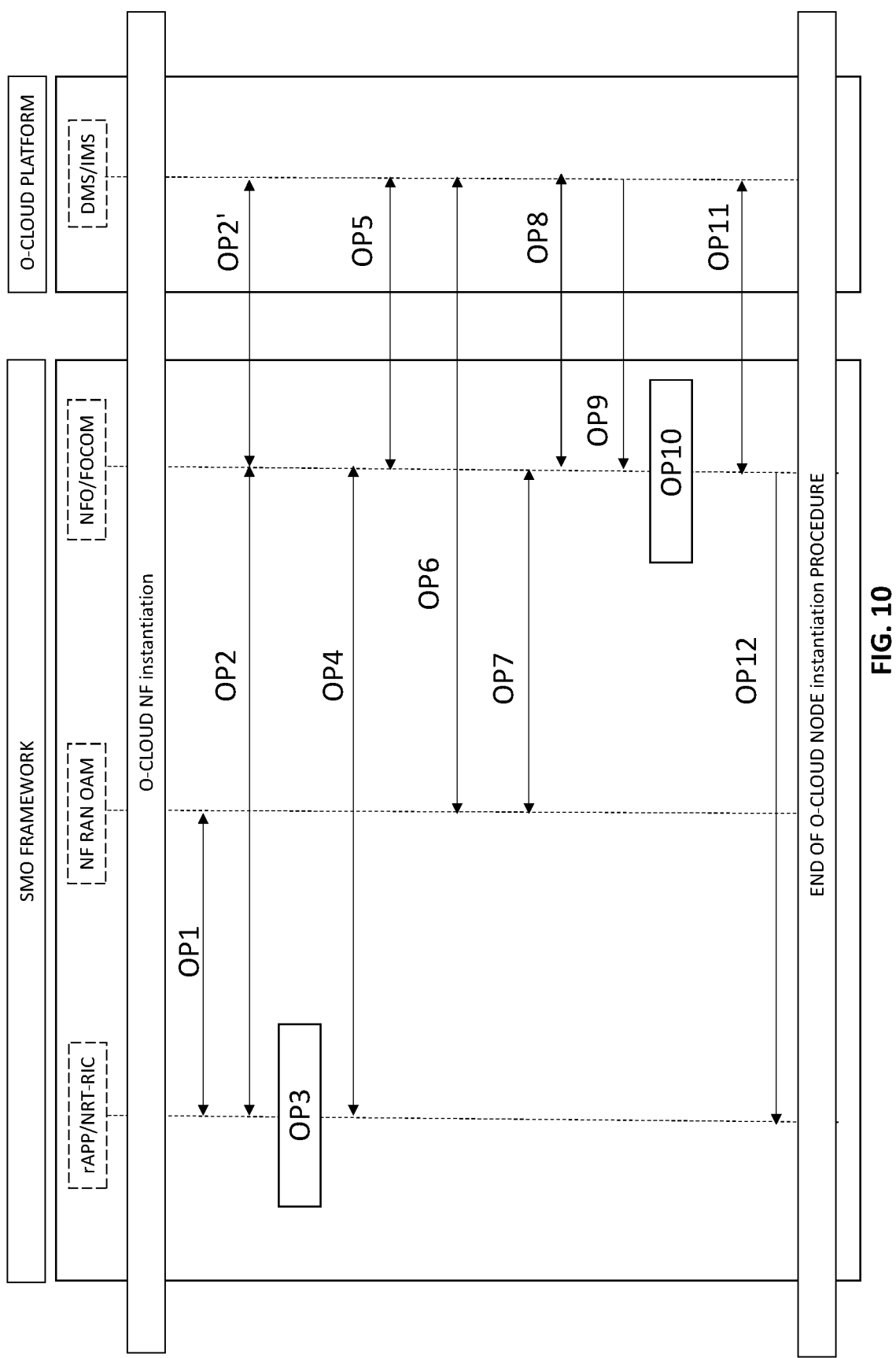
FIG. 10 illustrates a process flowchart of a method for O-Cloud NF instantiation according to another embodiment.

FIG. 10 illustrates a process flowchart of a method for O-Cloud NF instantiation according to another embodiment. Referring to FIG. 10, in operation 1, the rApp (e.g., a host operator rApp) collects O1-related data referring, for example, to performance degradation of reported (e.g., faulty) NFs from the NF-related RAN OAM Services.

In operation 2, the rApp (e.g., a host operator rApp) collects O2-related data (e.g., IMS and/or DMS telemetry data from ORMOS (e.g., according to operation 2', collects O2-related data via the FOCOM FCAPS and/or the NFO FCAPS from the DMS and/or IMS).

In operation 3, the rApp creates an R1 policy for a RAN operation scenario (e.g., an update of a tenant operator's SLA).

In operation 4, the rApp sends the R1-policy to ORMOS.

In operation 5, the NFO collects data from the DMS to prepare for an instantiation of new NFS (e.g., CNFs) on O-Cloud nodes according to the O-Cloud infrastructure. (e.g., via the NFO FCAPS)

In operation 6, the NFO requests the deployment (instantiation) of new NFS (e.g., CNFs) on O-Cloud nodes (e.g., via the NFO FCAPS to the NF-related RAN OAM Services).

In operation 7, each of the created (deployed, instantiated) NFS registers at the NF-related RAN OAM Services is configured in accordance with its role (e.g., as an E2 node such as an O-CU, O-DU, etc.).

In operation 8, the NF-related RAN OAM Services send a configuration notice for the instantiated one or more NFs to the ORMOS. The configuration notice for the instantiated one or more NFs may be used for a sanity and health check of the new NFs at the NFO.

In operation 9, the NFO sends a request to terminate the determined one or more NFs on the at least one O-Cloud to the DMS. For example, if the sanity and health check of the new NFs is successful the NFO instructs the DMS to divert all traffic from the old NFs (CNFs) to the new NFs (CNFs). Once all traffic of the old NFs (CNFs) is diverted to the new NFs (CNFs) the DMS confirms the traffic diversion to the NFO.

In operation 10, upon the receipt of the DMS confirmation that all traffic was diverted to the NFO, the NFO communicates the creation confirmation and the termination of all traffic to the old NFs to the FOCOM.

In operation 11, the FOCOM requests the IMS to drain and cordon one or more O-Cloud nodes that originally hosted the old (terminated) NFs. Upon unloading and cordoning the one or more O-Cloud nodes, the IMS sends a confirmation notice to the FOCOM. (e.g., confirmation notice may comprise inventory information and/or feedback to the termination).

In operation 12, the ORMOS (e.g., the FOCOM) sends a policy (i.e., R1 policy) feedback to the rApp.

Referring to FIG. 10, the method for O-Cloud NF instantiation based on an R1 policy for the ORMOS according to operation 1 to 11 has the advantage of guidance on how to instantiate NFs (i.e., VNFs and/or CNFs) to realize an optimal (e.g., energy-efficient, resource-optimized, resilience-optimized, etc.) operational performance of the O-RAN.

Figure 11:
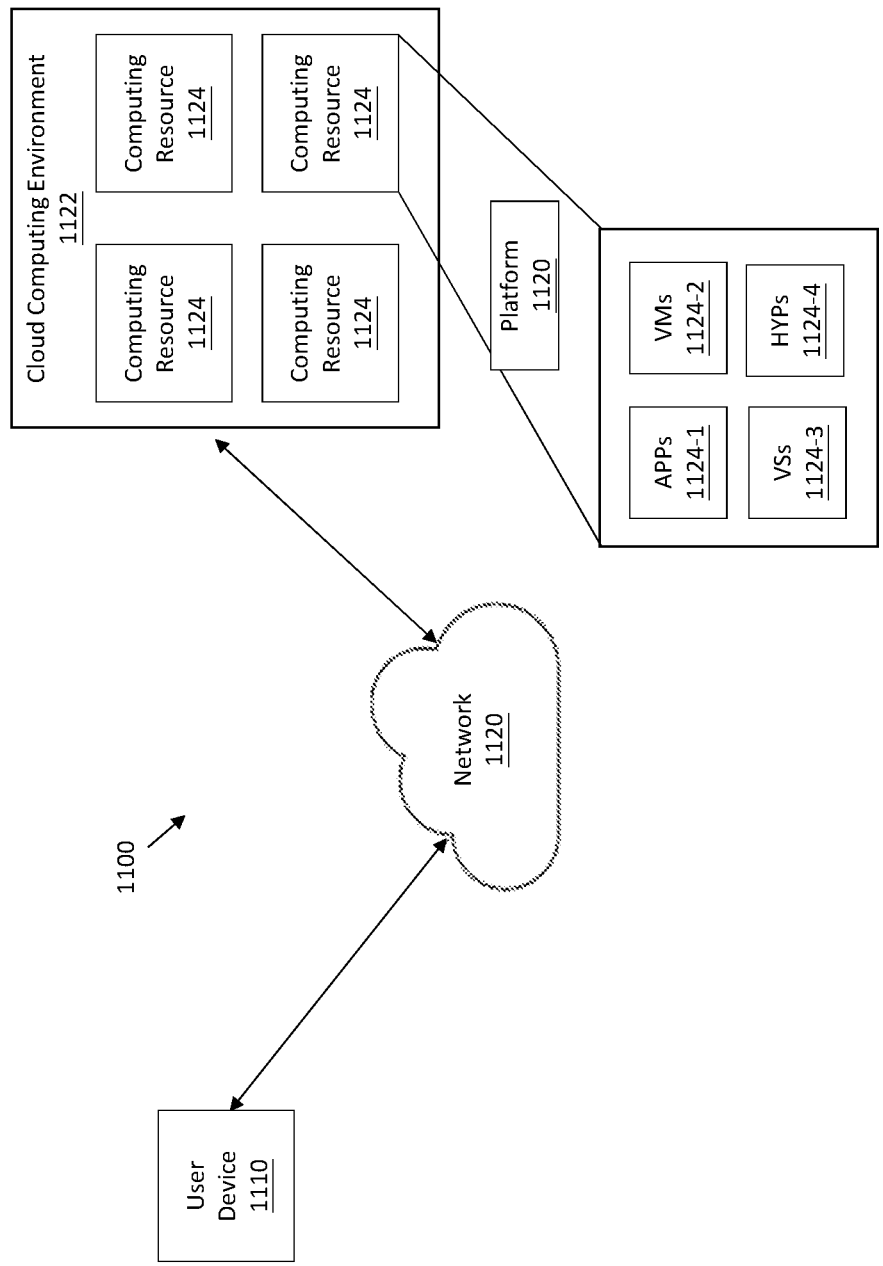
FIG. 11 is a diagram of an example environment in which systems and/or methods, described herein, may be implemented.

FIG. 11 is a diagram of an example environment 1100 in which systems and/or methods, described herein, may be implemented. As shown in FIG. 11, environment 1100 may include a user device 1110, a platform 1120, and a network 1130. Devices of environment 1100 may interconnect via wired connections, wireless connections, or a combination of wired and wireless connections. In embodiments, any of the functions and operations described with reference to FIGS. 1 through 10 above may be performed by any combination of elements illustrated in FIG. 11.

User device 1110 includes one or more devices capable of receiving, generating, storing, processing, and/or providing information associated with platform 1120. For example, user device 1110 may include a computing device (e.g., a desktop computer, a laptop computer, a tablet computer, a handheld computer, a smart speaker, a server, etc.), a mobile phone (e.g., a smartphone, a radiotelephone, etc.), a wearable device (e.g., a pair of smart glasses or a smart watch), or a similar device. In some implementations, user device 1110 may receive information from and/or transmit information to platform 1120.

Platform 1120 includes one or more devices capable of receiving, generating, storing, processing, and/or providing information. In some implementations, platform 1120 may include a cloud server or a group of cloud servers. In some implementations, platform 1120 may be designed to be modular such that certain software components may be swapped in or out depending on a particular need. As such, platform 1120 may be easily and/or quickly reconfigured for different uses.

In some implementations, as shown, platform 1120 may be hosted in cloud computing environment 1122. Notably, while implementations described herein describe platform 1120 as being hosted in cloud computing environment 1122, in some implementations, platform 1120 may not be cloud-based (i.e., may be implemented outside of a cloud computing environment) or may be partially cloud-based.

Cloud computing environment 1122 includes an environment that hosts platform 1120. Cloud computing environment 1122 may provide computation, software, data access, storage, etc., services that do not require end-user (e.g., user device 1110) knowledge of a physical location and configuration of system(s) and/or device(s) that hosts platform 1120. As shown, cloud computing environment 1122 may include a group of computing resources 1124 (referred to collectively as "computing resources 1124" and individually as "computing resource 1124").

Computing resource 1124 includes one or more personal computers, a cluster of computing devices, workstation computers, server devices, or other types of computation and/or communication devices. In some implementations, computing resource 1124 may host platform 1120. The cloud resources may include compute instances executing in computing resource 1124, storage devices provided in computing resource 1124, data transfer devices provided by computing resource 1124, etc. In some implementations, computing resource 1124 may communicate with other computing resources 1124 via wired connections, wireless connections, or a combination of wired and wireless connections.

As further shown in FIG. 11, computing resource 1124 includes a group of cloud resources, such as one or more applications ("APPs") 1124-1, one or more virtual machines ("VMs") 1124-2, virtualized storage ("VSs") 1124-3, one or more hypervisors ("HYPs") 1124-4, or the like.

Application 1124-1 includes one or more software applications that may be provided to or accessed by user device 1110. Application 1124-1 may eliminate a need to install and execute the software applications on user device 1110. For example, application 1124-1 may include software associated with platform 1120 and/or any other software capable of being provided via cloud computing environment 1122. In some implementations, one application 1124-1 may send/receive information to/from one or more other applications 1124-1, via virtual machine 1124-2.

Virtual machine 1124-2 includes a software implementation of a machine (e.g., a computer) that executes programs like a physical machine. Virtual machine 1124-2 may be either a system virtual machine or a process virtual machine, depending upon use and degree of correspondence to any real machine by virtual machine 1124-2. A system virtual machine may provide a complete system platform that supports execution of a complete operating system ("OS"). A process virtual machine may execute a single program, and may support a single process. In some implementations, virtual machine 1124-2 may execute on behalf of a user (e.g., user device 1110), and may manage infrastructure of cloud computing environment 1122, such as data management, synchronization, or long-duration data transfers.

Virtualized storage 1124-3 includes one or more storage systems and/or one or more devices that use virtualization techniques within the storage systems or devices of computing resource 1124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 1124-4 may provide hardware virtualization techniques that allow multiple operating systems (e.g., "guest operating systems") to execute concurrently on a host computer, such as computing resource 1124. Hypervisor 1124-4 may present a virtual operating platform to the guest operating systems, and may manage the execution of the guest operating systems. Multiple instances of a variety of operating systems may share virtualized hardware resources.

Network 1130 includes one or more wired and/or wireless networks. For example, network 1130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) of environment 1100 may perform one or more functions described as being performed by another set of devices of environment 1100.

Figure 12:
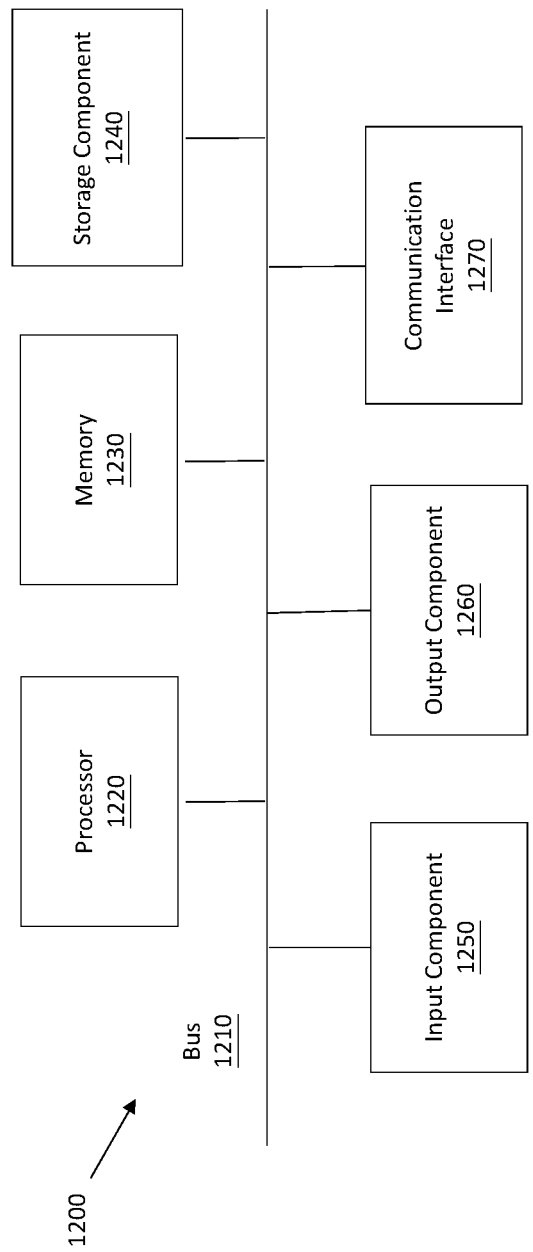
FIG. 12 is a diagram of example components of a device according to an embodiment.

FIG. 12 is a diagram of example components of a device 1200. Device 1200 may correspond to user device 1110 and/or platform 1120. As shown in FIG. 12, device 1200 may include a bus 1210, a processor 1220, a memory 1230, a storage component 1240, an input component 1250, an output component 1260, and a communication interface 1270.

Bus 1210 includes a component that permits communication among the components of device 1200. Processor 1220 may be implemented in hardware, firmware, or a combination of hardware and software. Processor 1220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1220 includes one or more processors capable of being programmed to perform a function. Memory 1230 includes a random-access memory (RAM), a read only memory (ROM), and/or another type of dynamic or static storage device (e.g., a flash memory, a magnetic memory, and/or an optical memory) that stores information and/or instructions for use by processor 1220.

Storage component 1240 stores information and/or software related to the operation and use of device 1200. For example, storage component 1240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 1250 includes a component that permits device 1200 to receive information, such as via user input (e.g., a touch screen display, a keyboard, a keypad, a mouse, a button, a switch, and/or a microphone). Additionally, or alternatively, input component 1250 may include a sensor for sensing information (e.g., a global positioning system (GPS) component, an accelerometer, a gyroscope, and/or an actuator). Output component 1260 includes a component that provides output information from device 1200 (e.g., a display, a speaker, and/or one or more light-emitting diodes (LEDs)).

Communication interface 1270 includes a transceiver-like component (e.g., a transceiver and/or a separate receiver and transmitter) that enables device 1200 to communicate with other devices, such as via a wired connection, a wireless connection, or a combination of wired and wireless connections. Communication interface 1270 may permit device 1200 to receive information from another device and/or provide information to another device. For example, communication interface 1270 may include an Ethernet interface, an optical interface, a coaxial interface, an infrared interface, a radio frequency (RF) interface, a universal serial bus (USB) interface, a Wi-Fi interface, a cellular network interface, or the like.

Device 1200 may perform one or more processes described herein. Device 1200 may perform these processes in response to processor 1220 executing software instructions stored by a non-transitory computer-readable medium, such as memory 1230 and/or storage component 1240. A computer-readable medium is defined herein as a non-transitory memory device. A memory device includes memory space within a single physical storage device or memory space spread across multiple physical storage devices.

Software instructions may be read into memory 1230 and/or storage component 1240 from another computer-readable medium or from another device via communication interface 1270. When executed, software instructions stored in memory 1230 and/or storage component 1240 may cause processor 1220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 12 are provided as an example. In practice, device 1200 may include additional components, fewer components, different components, or differently arranged components than those shown in FIG. 12. Additionally, or alternatively, a set of components (e.g., one or more components) of device 1200 may perform one or more functions described as being performed by another set of components of device 1200.

In embodiments, any one of the operations or processes of FIGS. 1 to 10 may be implemented by or using any one of the elements illustrated in FIGS. 11 and 12.

Example embodiments may be implemented in accordance with the below description:
- O-Cloud Optimization Framework WG1 SMO Decoupled TR
- Problem Statement
- No Use-cases defined for in SMO Decoupled TR about data collection, Policy based changes, configuration changes to NFO & FOCOM.
- Data exposure Capabilities from NFO/FOCOM to rApp through SME not defined.
- Type of Data NFO/FOCOM need to collect from O-Cloud over O2 interface not defined in TR. Capabilities to receive Policy or Actions from North bound not defined.
- Interaction required between NFO & FOCOM required to carry out specific actions such as in Node draining FOCOM shall interrogate with NFO for making O-Cloud Node Idle by relocating NFs from one Node to other.
- Capabilities of Non-RT RIC SMOs need to defined to push policies or changes to NFO/FOCOM over R1 interface through O2 related functions (which can be renamed to ORMO related functions) Use case under Non-RT RIC SMOs, which shows how rApp can push polices/changes to NFO/FOCOM is not present.
- Capabilities for NFO & FOCOM for Policy based Framework
- Network Function Orchestration SMOS (NFO)

The capabilities of NFO SMOS include:
- Receiving & responding policies from Non-RT RIC & enforcing them towards O-Cloud over O2 interface
- Reporting O-Cloud Deployment telemetry to other SMOS such as DME, Topology and Inventory related SMOS, Non-RT RIC SMOs
- Federated O-Cloud Orchestration and Management SMOS (FOCOM)

Figure 13:
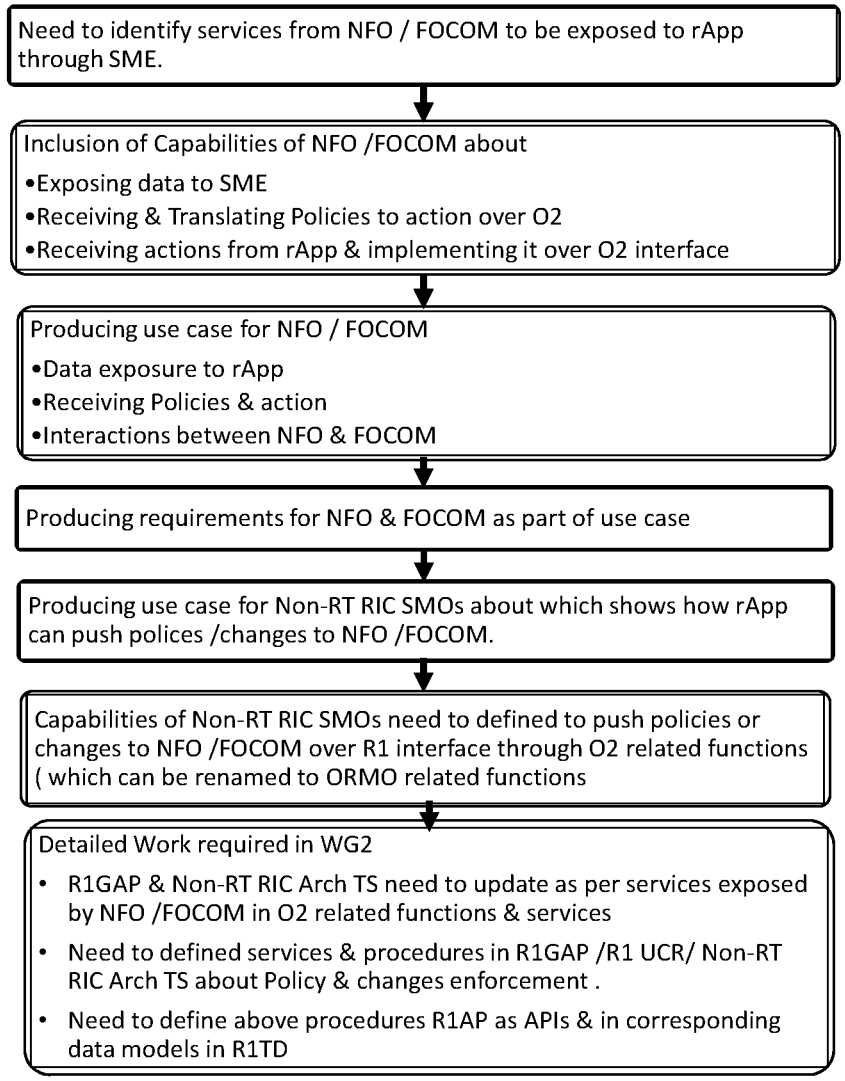
FIG. 13 illustrates tentative Roadmap for specifying NFO/FOCOM related services for R1.

The capabilities of FOCOM SMOS include:
- Receiving & responding policies from Non-RT RIC & enforcing them towards O-Cloud over O2 interface
- Reporting O-Cloud Deployment telemetry to other SMOS such as DME, Topology and Inventory related SMOS, Non-RT RIC SMOs FIG. 13 illustrates tentative Roadmap for specifying NFO/FOCOM related services for R1.

Figure 14:
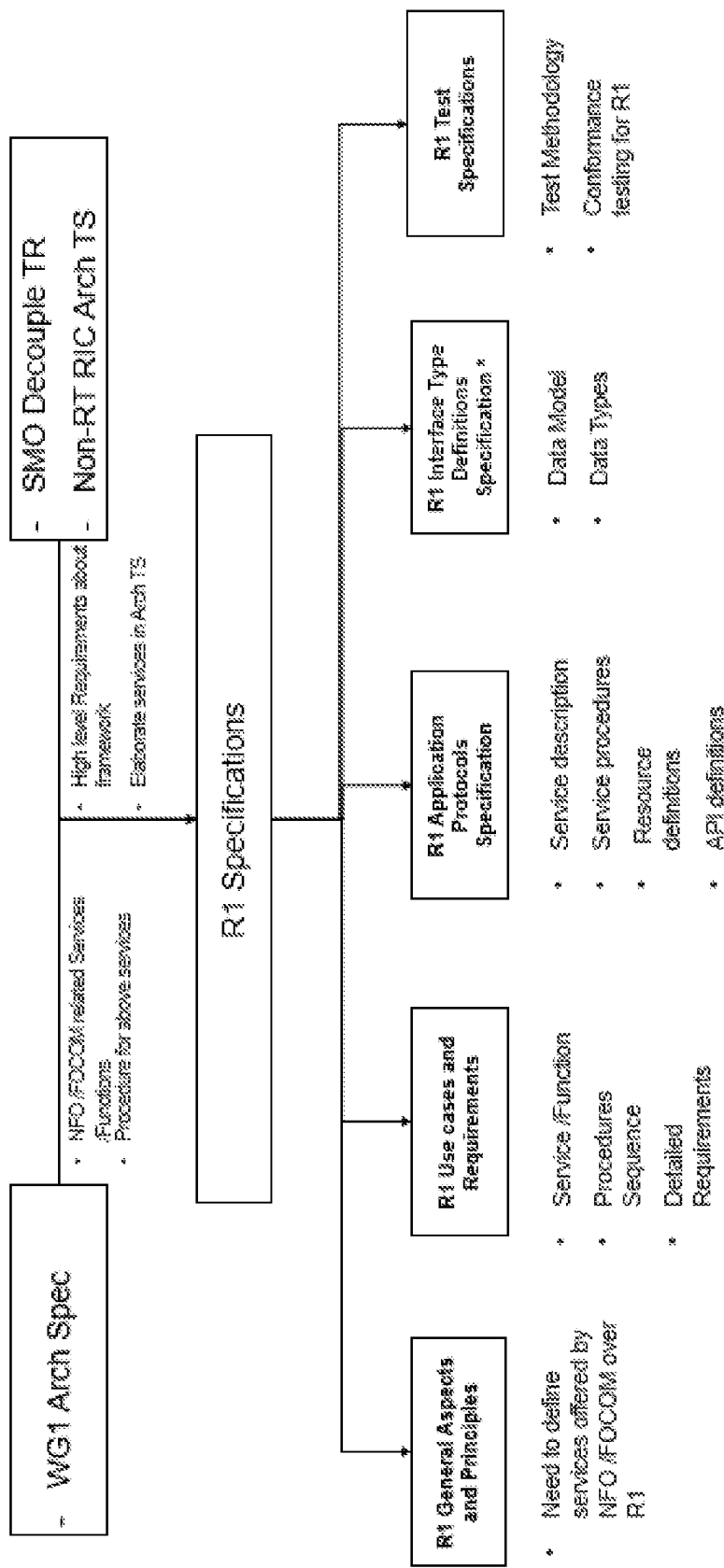
FIG. 14 illustrates a proposed Structure for R1 Interface.

FIG. 14 illustrates a proposed Structure for R1 Interface. RAN Sharing SLA Assurance Use case

| # RAN Sharing SLA Policy |
|---|
| {<br>"policy_id": "1",<br>"Scope": {<br>  "Actor"  : NFO<br>  "oCloudId"  :"ABx65201"<br>  "globalcloudId" : "GCx909034598"<br>},<br>"Statement": {<br>  "Operation" : "NF create"<br>  "target" : {<br>    "targetype"  :"CNF"<br>    "O-RANNFtype"  : "O-CU-UP"<br>"policy_id": "2",<br>"Scope": {<br>  "Actor"  : NFO<br>  "oCloudId"  :"ABx65201"<br>  "globalcloudId" : "GCx909034598"<br>  "cnfcInstanceID" :"CNFxCD0090<br>},<br>"Statement": {<br>  "Operation" : "NF Terminate"<br>  "target" : {<br>    "targetype"  :"CNF"<br>    "O-RANNFtype"  : "O-CU-UP"<br>}<br>} |

Figure 15:
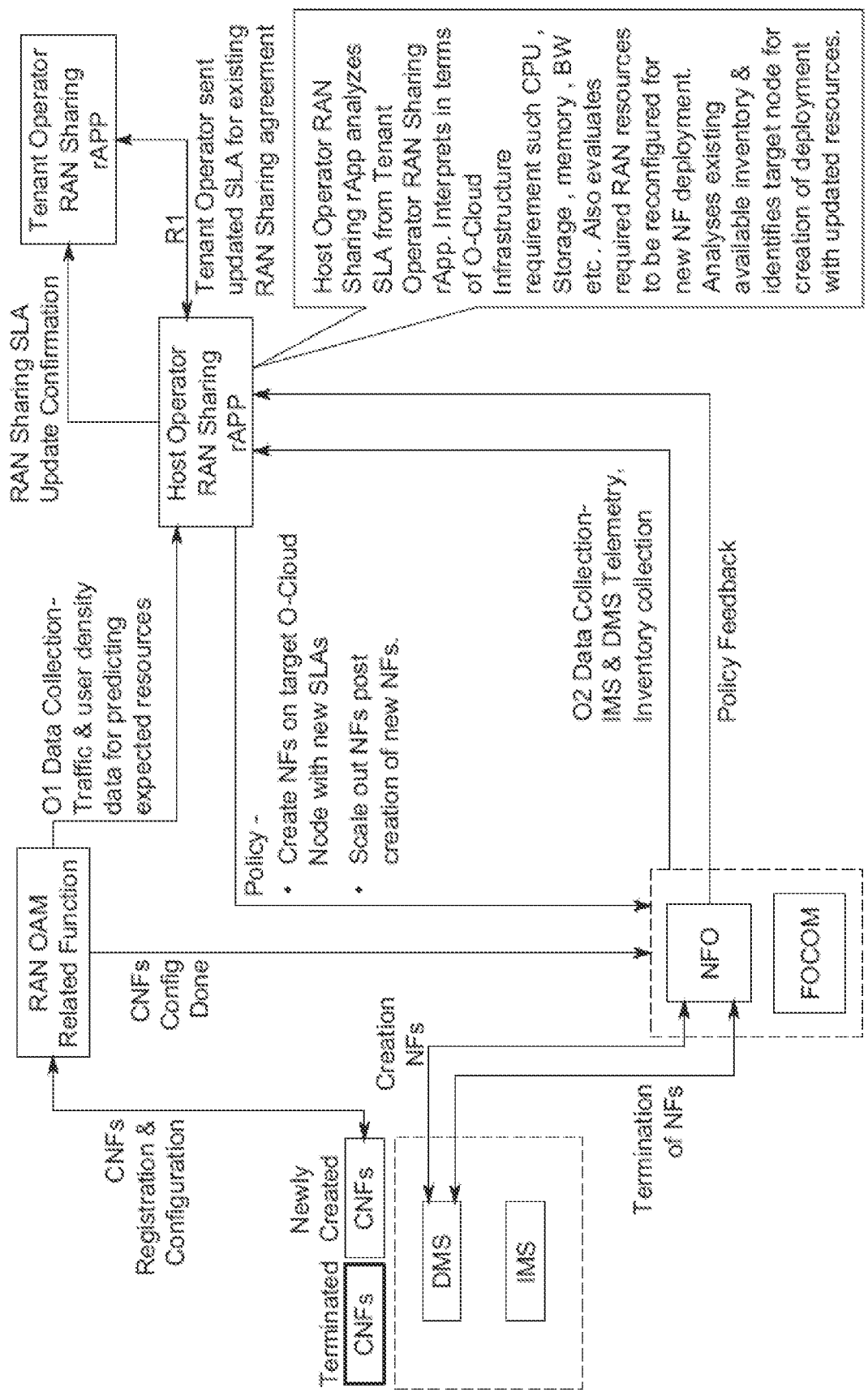
FIG. 15 illustrates a RAN Sharing SLA Assurance Use case.

FIG. 15 illustrates a RAN Sharing SLA Assurance Use case

Policy Based Fault Finding & Node Draining Use Case

| # Node Draining Policy |
|---|
| {<br>"policy_id": "1",<br>"Scope": {<br>  "Actor"  : FOCOM<br>  "oCloudId"  :"ABx65201",<br>  "globalcloudId" : "GCx909034598"<br>},<br>"Statement": {<br>  "Operation" : "Drain O-Cloud Node"<br>  "target" : {<br>    "targetype" :"VM"<br>"policy_id": "2",<br>"Scope": {<br>  "Actor"  : NFO<br>  "oCloudId"  :"ABx45201"<br>  "globalcloudId" : "GCx789034598"<br>},<br>"Statement": {<br>  "Operation" : "NF create" |

```
# Node Draining Policy

"target" : {
    "targetype" :"CNF"
    "NFtype"   : "O-DU"
"policy_id": "3",
"Scope": {
   "Actor"   : NFO
   "oCloudId"   :"ABx65201"
   "globalcloudId" : "GCx909034598"
   "cnfcInstanceID" :"CNFxCD0090
},
"Statement": {
   "Operation" : "NF Terminate"
   "target" : {
       "targetype"  :"CNF"
       "O-RANNFtype"   : "O-DU"
   }
}
```

Figure 16:
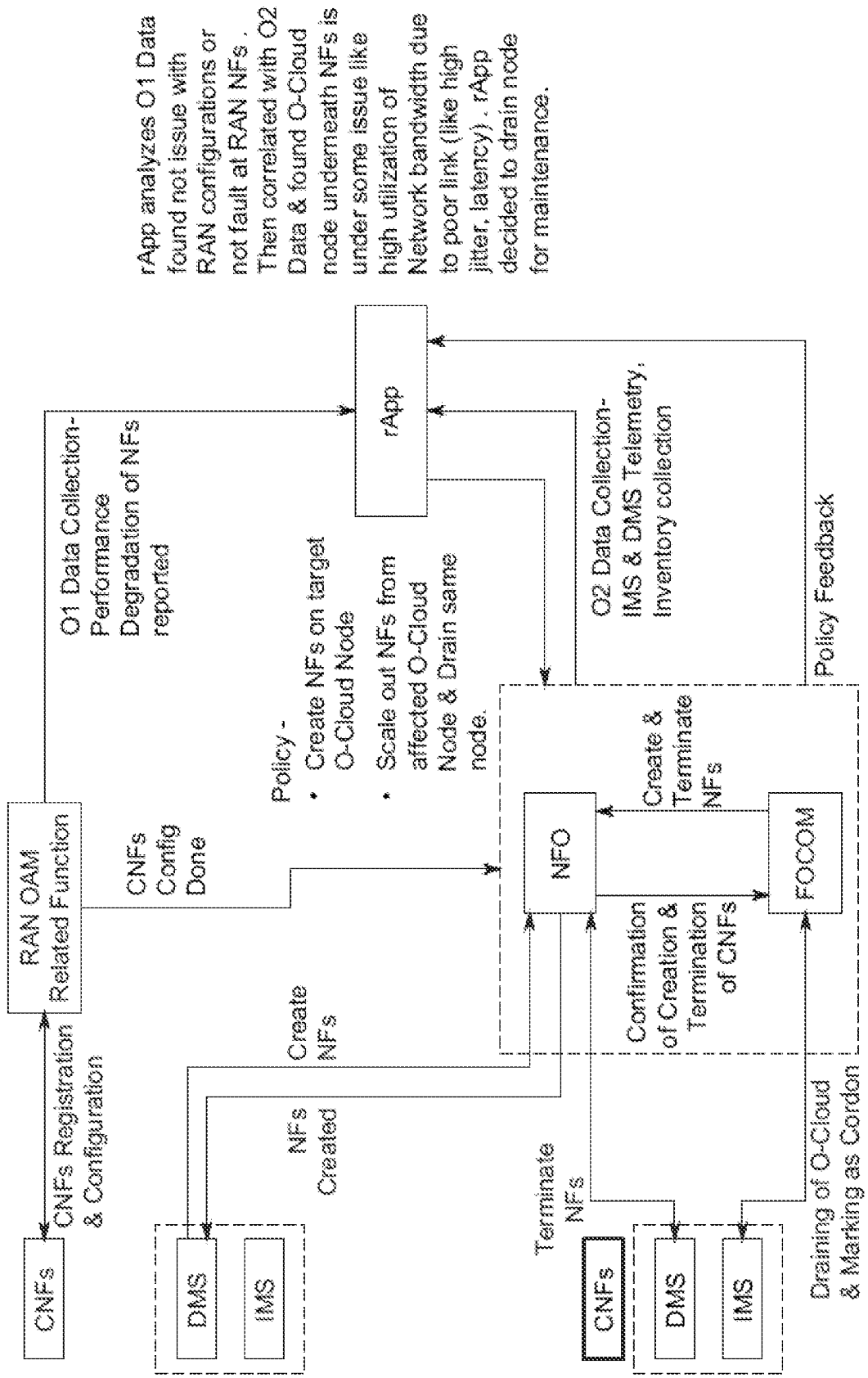
FIG. 16 illustrates a Policy based Fault Finding & Node Draining Use case.

FIG. 16 illustrates a Policy based Fault Finding & Node Draining Use case.

Appendix

Services from NFO & FOCOM n order to collect data & provision changes, datatypes need to identify which will be registered over DME. It can be divided into 2 types of FCAPS Related to O-Cloud FOCOM Related FCAPS Services (o2ims FCAPS services)

PM may contain,

O-Cloud Infrastructure Monitoring Service which can provide Infrastructure Telemetry to monitor the health of the O-Cloud Infrastructure components. Network Operations are interested in discovering if all the components in the O-Cloud Infrastructure are working properly and at what capacity, how many deployments are running on each node, and the resource utilization of the O-Cloud Infrastructure.

FM shall contain fault reporting related to infrastructure

CM services can include,

Reporting Infrastructure configurations schemas such as Inventories

Provisioning changes related to Infrastructure Lifecycle Management.

To obtain information related to O-Cloud infrastructure management services such as, O-Cloud IMS Performance Measurement Infrastructure Inventory.

Infrastructure Monitoring.

Infrastructure Provisioning.

Infrastructure Lifecycle Management.

Infrastructure Software Management.

NFO Related Services (o2dms related services)

To obtain information related to O-Cloud deployment management services such as, Deployment Inventory.

Deployment Monitoring.

Deployment Lifecycle Management.

It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1] A system including an rApp, at least one O-Cloud management service, NF-related RAN OAM Services and O-Cloud Resource Management and Orchestration Services (ORMOS) configured to determine, by an rApp within a service management orchestration framework (SMO), one or more network functions (NFs) hosted on at least one O-Cloud node to be instantiated on one or more other O-Cloud nodes; create, by the rApp, an instantiation policy for the determined one or more NFs for the O-Cloud Resource Management and Orchestration Services (ORMOS), wherein the ORMOS may include a Network Function Orchestrator (NFO) and a Federated O-Cloud Orchestration and Management (FOCOM); send, by the rApp, the instantiation policy via an R1 interface to the ORMOS; based on the instantiation policy, request, by the ORMOS, an instantiation implementation of the determined one or more NFs via an O2 interface to at least one O-Cloud management service; upon receiving the implementation request, instantiate, by the at least one O-Cloud management service, one or more NFs on the one or more other O-Cloud nodes according to the implementation request, wherein the at least one O-Cloud management service may include deployment management services (DMS) and infrastructure management services (IMS); send, by the at least one O-Cloud management service, a registration and configuration request for the instantiated one or more NFs to NF-related radio access network (RAN) Operations, Administration and Maintenance (OAM) Services; based on the registration and configuration request, send, by the NF-related RAN OAM Services, a configuration notice for the instantiated one or more NFs to the ORMOS; and send, by the ORMOS, instructions to finalize the instantiation implementation of the determined one or more NFs to the at least one O-Cloud management service.

Item [2] The system according to Item [1], wherein the system configured to determine the one or more NFs hosted on at least one O-Cloud node to be instantiated on one or more other O-Cloud nodes may be further configured to: receive, by the rApp, metrics laying out a level of service of an updated service-level agreement (SLA); analyze, by the rApp, the metrics laying out a level of service of an updated service-level agreement (SLA); collect, by the App, O1-related performance data for predicting expected RAN resources from the NF-related RAN OAM Services and O2-related telemetry data of O-Cloud node inventory from the at least one O-Cloud management service; based on the collected data, by the rApp, evaluate the required RAN resources to be reconfigured for the instantiation of one or more NFs on the O-Cloud node inventory; and based on the evaluation, determine, by the rApp, the one or more NFs to be instantiated on one or more other O-Cloud nodes.

Item [3] The system according to Item [1 or 2], wherein the system configured to instantiate one or more NFs on at least one O-Cloud according to the implementation request may be further configured to: based on the received instantiation policy, send, by the NFO, instructions to deploy the determined one or more NFs on the one or more other O-Cloud nodes in accordance with the received instantiation policy to the DMS; and upon receipt of the deployment instructions, create, by the DMS, one or more NFs on the other one or more O-Cloud nodes.

Item [4] The system according to Item [3], wherein the system configured to create one or more NFs on the one or more other O-Cloud nodes, for each of the created one or more NFs may be further configured to: send, by each of the created one or more NFs, a NF registration and configuration request to the NF-related RAN OAM Services; upon receipt of the NF registration and configuration request, by the NF-related RAN OAM Services, register and configure each of the created one or more NFs; and send, by the NF-related RAN OAM Services, a configuration confirmation notice for each of the created one or more NFs to the NFO.

Item [5] The system according to Items [1 to 4], wherein the system configured to finalize the instantiation implementation of the determined one or more NFs may be further configured to: implement, by the at least one O-Cloud management service, the termination of the determined one or more NFs on the at least one O-Cloud node; and send feedback, by the at least one O-Cloud management service, to the termination of the determined one or more NFs on the at least one O-Cloud node to the ORMOS.

Item [6] The system according to Item [5], wherein the system configured to implement the termination of the determined one or more NFs may be further configured to: send, by the NFO, a request to terminate the determined one or more NFs on the at least one O-Cloud to the DMS; upon the termination of the determined one or more NFs, send, by the DMS, a termination confirmation notice; send, by the NFO, a termination confirmation notice to the FOCOM; based on the termination confirmation notice of the NFO, send, by the FOCOM, an implementation request for unloading the at least one O-Cloud node hosting the terminated one or more NFs to the IMS; and upon receiving the implementation request for unloading, instruct, by the IMS, the draining and/or cordoning of the at least one O-Cloud node.

Item [7] The system according to Item [5 or 6], wherein the system configured to send feedback to the termination of the determined one or more NFs to the ORMOS may be further configured to: upon unloading the at least one O-Cloud node, send, by the IMS, an unloading confirmation notice to the FOCOM; and based on the unloading confirmation, send, by the FOCOM, instantiation policy feedback to the rApp.

Item [8] A method includes determining, by an rApp within a service management orchestration framework (SMO), one or more network functions (NFs) hosted on at least one O-Cloud node to be instantiated on one or more other O-Cloud nodes; creating, by the rApp, an instantiation policy for the determined one or more NFs for the O-Cloud Resource Management and Orchestration Services (OR-MOS), wherein the ORMOS may include a Network Function Orchestrator (NFO) and a Federated O-Cloud Orchestration and Management (FOCOM); sending, by the rApp, the instantiation policy via an R1 interface to the ORMOS; based on the instantiation policy, requesting, by the ORMOS, an instantiation implementation of the determined one or more NFs via an O2 interface to at least one O-Cloud management service; upon receiving the implementation request, instantiating, by the at least one O-Cloud management service, one or more NFs on the one or more other O-Cloud nodes according to the implementation request, wherein the at least one O-Cloud management service may include deployment management services (DMS) and infrastructure management services (IMS); sending, by the at least one O-Cloud management service, a registration and configuration request for the instantiated one or more NFs to NF-related radio access network (RAN) Operations, Administration and Maintenance (OAM) Services; based on the registration and configuration request, sending, by the NF-related RAN OAM Services, a configuration notice for the instantiated one or more NFs to the ORMOS; and sending, by the ORMOS, instructions to finalize the instantiation implementation of the determined one or more NFs to the at least one O-Cloud management service.

Item [9] The method according to Item [8], wherein the method for determining the one or more NFs hosted on at least one O-Cloud node to be instantiated on one or more other O-Cloud nodes may further include: receiving, by the rApp, metrics laying out a level of service of an updated service-level agreement (SLA); analyzing, by the rApp, the metrics laying out a level of service of an updated service-level agreement (SLA); collecting, by the App, O1-related performance data for predicting expected RAN resources from the NF-related RAN OAM Services and O2-related telemetry data of O-Cloud node inventory from the at least one O-Cloud management service; based on the collected data, by the rApp, evaluating the required RAN resources to be reconfigured for the instantiation of one or more NFs on the O-Cloud node inventory; and based on the evaluation, determining, by the rApp, the one or more NFs to be instantiated on one or more other O-Cloud nodes.

Item [10] The method according to Item [8 or 9], wherein the method for instantiating one or more NFs on at least one O-Cloud according to the implementation request may further include: based on the received instantiation policy, sending, by the NFO, instructions to deploy the determined one or more NFs on the one or more other O-Cloud nodes in accordance with the received instantiation policy to the DMS; and upon receipt of the deployment instructions, creating, by the DMS, one or more NFs on the other one or more O-Cloud nodes.

Item [11] The method according to Item [10], wherein the method for creating one or more NFs on the one or more other O-Cloud nodes, for each of the created one or more NFs may further include: sending, by each of the created one or more NFs, a NF registration and configuration request to the NF-related RAN OAM Services; upon receipt of the NF registration and configuration requesting, by the NF-related RAN OAM Services, register and configure each of the created one or more NFs; and sending, by the NF-related RAN OAM Services, a configuration confirmation notice for each of the created one or more NFs to the NFO.

Item [12] The method according to Items [8 to 11], wherein the method for finalizing the instantiation implementation of the determined one or more NFs may further include: implementing, by the at least one O-Cloud management service, the termination of the determined one or more NFs on the at least one O-Cloud node; sending feedback, by the at least one O-Cloud management service, to the termination of the determined one or more NFs on the at least one O-Cloud node to the ORMOS.

Item [13] The method according to Item [12], wherein the method for implementing the termination of the determined one or more NFs may further include: sending, by the NFO, a request to terminate the determined one or more NFs on the at least one O-Cloud to the DMS; upon the termination of the determined one or more NFs, sending, by the DMS, a termination confirmation notice; sending, by the NFO, a termination confirmation notice to the FOCOM; based on the termination confirmation notice of the NFO, sending, by the FOCOM, an implementation request for unloading the at least one O-Cloud node hosting the terminated one or more NFs to the IMS; and upon receiving the implementation request for unloading, instructing, by the IMS, the draining and/or cordoning of the at least one O-Cloud node.

Item [14] The method according to Item [12 or 13], wherein the method for sending feedback to the termination of the determined one or more NFs to the ORMOS may further include: upon unloading the at least one O-Cloud node, sending, by the IMS, an unloading confirmation notice to the FOCOM; and based on the unloading confirmation, sending, by the FOCOM, instantiation policy feedback to the rApp.

Item [15] A non-transitory computer-readable recording medium having recorded thereon instructions executable by at least one processor configured to perform a method including determining, by an rApp within a service management orchestration framework (SMO), one or more network functions (NFs) hosted on at least one O-Cloud node to be instantiated on one or more other O-Cloud nodes; creating, by the rApp, an instantiation policy for the determined one or more NFs for the O-Cloud Resource Management and Orchestration Services (ORMOS), wherein the ORMOS may include a Network Function Orchestrator (NFO) and a Federated O-Cloud Orchestration and Management (FOCOM); sending, by the rApp, the instantiation policy via an R1 interface to the ORMOS; based on the instantiation policy, requesting, by the ORMOS, an instantiation implementation of the determined one or more NFs via an O2 interface to at least one O-Cloud management service; upon receiving the implementation request, instantiating, by the at least one O-Cloud management service, one or more NFs on the one or more other O-Cloud nodes according to the implementation request, wherein the at least one O-Cloud management service may include deployment management services (DMS) and infrastructure management services (IMS); sending, by the at least one O-Cloud management service, a registration and configuration request for the instantiated one or more NFs to NF-related radio access network (RAN) Operations, Administration and Maintenance (OAM) Services; based on the registration and configuration request, sending, by the NF-related RAN OAM Services, a configuration notice for the instantiated one or more NFs to the ORMOS; and sending, by the ORMOS, instructions to finalize the instantiation implementation of the determined one or more NFs to the at least one O-Cloud management service.

Item [16] The non-transitory computer-readable recording medium according to Item [15], wherein the method for determining the one or more NFs hosted on at least one O-Cloud node to be instantiated on one or more other O-Cloud nodes may further include: receiving, by the rApp, metrics laying out a level of service of an updated service-level agreement (SLA); analyzing, by the rApp, the metrics laying out a level of service of an updated service-level agreement (SLA); collecting, by the App, O1-related performance data for predicting expected RAN resources from the NF-related RAN OAM Services and O2-related telemetry data of O-Cloud node inventory from the at least one O-Cloud management service; based on the collected data, by the rApp, evaluating the required RAN resources to be reconfigured for the instantiation of one or more NFs on the O-Cloud node inventory; and based on the evaluation, determining, by the rApp, the one or more NFs to be instantiated on one or more other O-Cloud nodes.

Item [17] The non-transitory computer-readable recording medium according to Item [15 or 16], wherein the method for instantiating one or more NFs on at least one O-Cloud according to the implementation request may further include: based on the received instantiation policy, sending, by the NFO, instructions to deploy the determined one or more NFs on the one or more other O-Cloud nodes in accordance with the received instantiation policy to the DMS; and upon receipt of the deployment instructions, creating, by the DMS, one or more NFs on the other one or more O-Cloud nodes.

Item [18] The non-transitory computer-readable recording medium according to Item [17], wherein the method for instantiating one or more NFs on at least one O-Cloud according to the implementation request may further include: based on the received instantiation policy, sending, by the NFO, instructions to deploy the determined one or more NFs on the one or more other O-Cloud nodes in accordance with the received instantiation policy to the DMS; and upon receipt of the deployment instructions, creating, by the DMS, one or more NFs on the other one or more O-Cloud nodes.

Item [19] The non-transitory computer-readable recording medium according to Item [15 to 18], wherein the method for finalizing the instantiation implementation of the determined one or more NFs may further include: implementing, by the at least one O-Cloud management service, the termination of the determined one or more NFs on the at least one O-Cloud node; sending feedback, by the at least one O-Cloud management service, to the termination of the determined one or more NFs on the at least one O-Cloud node to the ORMOS.

Item [20] The non-transitory computer-readable recording medium according to Item [19], wherein the method for implementing the termination of the determined one or more NFs may further include: sending, by the NFO, a request to terminate the determined one or more NFs on the at least one O-Cloud to the DMS; upon the termination of the determined one or more NFs, sending, by the DMS, a termination confirmation notice; sending, by the NFO, a termination confirmation notice to the FOCOM; based on the termination confirmation notice of the NFO, sending, by the FOCOM, an implementation request for unloading the at least one O-Cloud node hosting the terminated one or more NFs to the IMS; and upon receiving the implementation request for unloading, instructing, by the IMS, the draining and/or cordoning of the at least one O-Cloud node.

What is claimed is:

1. A system comprising an rApp, at least one O-Cloud management service, NF-related RAN OAM Services and O-Cloud Resource Management and Orchestration Services (ORMOS), the system configured to:
   determine, by an rApp within a service management orchestration framework (SMO), one or more network functions (NFs) hosted on at least one O-Cloud node to be instantiated on one or more other O-Cloud nodes;
   create, by the rApp, an instantiation policy for the determined one or more NFs for the O-Cloud Resource Management and Orchestration Services (ORMOS), the ORMOS comprising at least one of an Network Function Orchestrator (NFO) or a Federated O-Cloud Orchestration and Management (FOCOM);
   send, by the rApp, the instantiation policy via an R1 interface to the ORMOS;
   based on the instantiation policy, request, by the ORMOS, an instantiation implementation of the determined one or more NFs via an O2 interface to at least one O-Cloud management service;
   upon receiving the implementation request, instantiate, by the at least one O-Cloud management service, one or more NFs on the one or more other O-Cloud nodes according to the implementation request, the at least one O-Cloud management service comprising at least one of deployment management services (DMS) or infrastructure management services (IMS);

send, by the at least one O-Cloud management service, a registration and configuration request for the instantiated one or more NFs to NF-related radio access network (RAN) Operations, Administration and Maintenance (OAM) Services;

based on the registration and configuration request, send, by the NF-related RAN OAM Services, a configuration notice for the instantiated one or more NFs to the ORMOS; and send, by the ORMOS, instructions to finalize the instantiation implementation of the determined one or more NFs to the at least one O-Cloud management service.

2. The system as claimed in claim 1, wherein the system configured to determine the one or more NFs hosted on at least one O-Cloud node to be instantiated on one or more other O-Cloud nodes is further configured to:

receive, by the rApp, metrics laying out a level of service of an updated service-level agreement (SLA);

analyze, by the rApp, the metrics laying out a level of service of an updated service-level agreement (SLA);

collect, by the App, O1-related performance data for predicting expected RAN resources from the NF-related RAN OAM Services and O2-related telemetry data of O-Cloud node inventory from the at least one O-Cloud management service;

based on the collected data, by the rApp, evaluate the required RAN resources to be reconfigured for the instantiation of one or more NFs on the O-Cloud node inventory; and based on the evaluation, determine, by the rApp, the one or more NFs to be instantiated on one or more other O-Cloud nodes.

3. The system as claimed in claim 1, wherein the system configured to instantiating one or more NFs on at least one O-Cloud according to the implementation request is further configured to:

based on the received instantiation policy, send, by the NFO, instructions to deploy the determined one or more NFs on the one or more other O-Cloud nodes in accordance with the received instantiation policy to the DMS; and upon receipt of the deployment instructions, create, by the DMS, one or more NFs on the other one or more O-Cloud nodes.

4. The system as claimed in claim 3, wherein the system configured to creating one or more NFs on the one or more other O-Cloud nodes, for each of the created one or more NFs is further configured to:

send, by each of the created one or more NFs, a NF registration and configuration request to the NF-related RAN OAM Services;

upon receipt of the NF registration and configuration request, by the NF-related RAN OAM Services, register and configure each of the created one or more NFs; and send, by the NF-related RAN OAM Services, a configuration confirmation notice for each of the created one or more NFs to the NFO.

5. The system as claimed in claim 1, wherein system configured to finalize the instantiation implementation of the determined one or more NFs is further configured to:

implement, by the at least one O-Cloud management service, the termination of the determined one or more NFs on the at least one O-Cloud node; and send feedback, by the at least one O-Cloud management service, to the termination of the determined one or more NFs on the at least one O-Cloud node to the ORMOS.

6. The system as claimed in claim 5, wherein the system configured to implement the termination of the determined one or more NFs is further configured to:

send, by the NFO, a request to terminate the determined one or more NFs on the at least one O-Cloud to the DMS;

upon the termination of the determined one or more NFs, send, by the DMS, a termination confirmation notice;

send, by the NFO, a termination confirmation notice to the FOCOM;

based on the termination confirmation notice of the NFO, send, by the FOCOM, an implementation request for unloading the at least one O-Cloud node hosting the terminated one or more NFs to the IMS; and upon receiving the implementation request for unloading, instruct, by the IMS, the draining and/or cordoning of the at least one O-Cloud node.

7. The system as claimed in claim 6, wherein the system to send feedback to the termination of the determined one or more NFs to the ORMOS is further configured to:

upon unloading the at least one O-Cloud node, send, by the IMS, an unloading confirmation notice to the FOCOM; and based on the unloading confirmation, send, by the FOCOM, instantiation policy feedback to the rApp.

8. A method comprising:

determining, by an rApp within a service management orchestration framework (SMO), one or more network functions (NFs) hosted on at least one O-Cloud node to be instantiated on one or more other O-Cloud nodes;

creating, by the rApp, an instantiation policy for the determined one or more NFs for the O-Cloud Resource Management and Orchestration Services (ORMOS), the ORMOS comprising at least one of a Network Function Orchestrator (NFO) or a Federated O-Cloud Orchestration and Management (FOCOM);

sending, by the rApp, the instantiation policy via an R1 interface to the ORMOS;

based on the instantiation policy, requesting, by the ORMOS, an instantiation implementation of the determined one or more NFs via an O2 interface to at least one O-Cloud management service;

upon receiving the implementation request, instantiating, by the at least one O-Cloud management service, one or more NFs on the one or more other O-Cloud nodes according to the implementation request, the at least one O-Cloud management service comprising at least one of deployment management services (DMS) or infrastructure management services (IMS);

sending, by the at least one O-Cloud management service, a registration and configuration request for the instantiated one or more NFs to NF-related radio access network (RAN) Operations, Administration and Maintenance (OAM) Services;

based on the registration and configuration request, sending, by the NF-related RAN OAM Services, a configuration notice for the instantiated one or more NFs to the ORMOS; and sending, by the ORMOS, instructions to finalize the instantiation implementation of the determined one or more NFs to the at least one O-Cloud management service.

9. The method as claimed in claim 8, wherein method for determining the one or more NFs hosted on at least one O-Cloud node to be instantiated on one or more other O-Cloud nodes further comprises:
receiving, by the rApp, metrics laying out a level of service of an updated service-level agreement (SLA);
analyzing, by the rApp, the metrics laying out a level of service of an updated service-level agreement (SLA);
collecting, by the App, O1-related performance data for predicting expected RAN resources from the NF-related RAN OAM Services and O2-related telemetry data of O-Cloud node inventory from the at least one O-Cloud management service;
based on the collected data, by the rApp, evaluating the required RAN resources to be reconfigured for the instantiation of one or more NFs on the O-Cloud node inventory; and
based on the evaluation, determining, by the rApp, the one or more NFs to be instantiated on one or more other O-Cloud nodes.

10. The method as claimed in claim 8, wherein the method for instantiating one or more NFs on at least one O-Cloud according to the implementation request further comprises:
based on the received instantiation policy, sending, by the NFO, instructions to deploy the determined one or more NFs on the one or more other O-Cloud nodes in accordance with the received instantiation policy to the DMS; and
upon receipt of the deployment instructions, creating, by the DMS, one or more NFs on the other one or more O-Cloud nodes.

11. The method as claimed in claim 10, wherein the method for instantiating one or more NFs on at least one O-Cloud according to the implementation request further comprises:
based on the received instantiation policy, sending, by the NFO, instructions to deploy the determined one or more NFs on the one or more other O-Cloud nodes in accordance with the received instantiation policy to the DMS; and
upon receipt of the deployment instructions, creating, by the DMS, one or more NFs on the other one or more O-Cloud nodes.

12. The method as claimed in claim 8, wherein the method for finalizing the instantiation implementation of the determined one or more NFs further comprises:
implementing, by the at least one O-Cloud management service, the termination of the determined one or more NFs on the at least one O-Cloud node;
sending feedback, by the at least one O-Cloud management service, to the termination of the determined one or more NFs on the at least one O-Cloud node to the ORMOS.

13. The method as claimed in claim 12, wherein the method for implementing the termination of the determined one or more NFs further comprises:
sending, by the NFO, a request to terminate the determined one or more NFs on the at least one O-Cloud to the DMS;
upon the termination of the determined one or more NFs, sending, by the DMS, a termination confirmation notice;

sending, by the NFO, a termination confirmation notice to the FOCOM;
based on the termination confirmation notice of the NFO, sending, by the FOCOM, an implementation request for unloading the at least one O-Cloud node hosting the terminated one or more NFs to the IMS; and
upon receiving the implementation request for unloading, instructing, by the IMS, the draining and/or cordoning of the at least one O-Cloud node.

14. The method as claimed in claim 13, wherein the method for sending feedback to the termination of the determined one or more NFs to the ORMOS further comprises:
upon unloading the at least one O-Cloud node, sending, by the IMS, an unloading confirmation notice to the FOCOM; and
based on the unloading confirmation, sending, by the FOCOM, instantiation policy feedback to the rApp.

15. A non-transitory computer-readable recording medium having recorded thereon instructions executable by at least one processor configured to perform a method comprising:
determining, by an rApp within a service management orchestration framework (SMO), one or more network functions (NFs) hosted on at least one O-Cloud node to be instantiated on one or more other O-Cloud nodes;
creating, by the rApp, an instantiation policy for the determined one or more NFs for the O-Cloud Resource Management and Orchestration Services (ORMOS), the ORMOS comprising at least one of a Network Function Orchestrator (NFO) or a Federated O-Cloud Orchestration and Management (FOCOM);
sending, by the rApp, the instantiation policy via an R1 interface to the ORMOS;
based on the instantiation policy, requesting, by the ORMOS, an instantiation implementation of the determined one or more NFs via an O2 interface to at least one O-Cloud management service;
upon receiving the implementation request, instantiating, by the at least one O-Cloud management service, one or more NFs on the one or more other O-Cloud nodes according to the implementation request, the at least one O-Cloud management service comprising at least one of deployment management services (DMS) or infrastructure management services (IMS);
sending, by the at least one O-Cloud management service, a registration and configuration request for the instantiated one or more NFs to NF-related radio access network (RAN) Operations, Administration and Maintenance (OAM) Services;
based on the registration and configuration request, sending, by the NF-related RAN OAM Services, a configuration notice for the instantiated one or more NFs to the ORMOS; and
sending, by the ORMOS, instructions to finalize the instantiation implementation of the determined one or more NFs to the at least one O-Cloud management service.

16. The non-transitory computer-readable recording medium as claimed in claim 15, wherein the method for determining the one or more NFs hosted on at least one O-Cloud node to be instantiated on one or more other O-Cloud nodes further comprises:
receiving, by the rApp, metrics laying out a level of service of an updated service-level agreement (SLA);
analyzing, by the rApp, the metrics laying out a level of service of an updated service-level agreement (SLA);

collecting, by the App, O1-related performance data for predicting expected RAN resources from the NF-related RAN OAM Services and O2-related telemetry data of O-Cloud node inventory from the at least one O-Cloud management service;

based on the collected data, by the rApp, evaluating the required RAN resources to be reconfigured for the instantiation of one or more NFs on the O-Cloud node inventory; and based on the evaluation, determining, by the rApp, the one or more NFs to be instantiated on one or more other O-Cloud nodes.

17. The non-transitory computer-readable recording medium as claimed in claim 15, wherein the method for instantiating one or more NFs on at least one O-Cloud according to the implementation request further comprises:

based on the received instantiation policy, sending, by the NFO, instructions to deploy the determined one or more NFs on the one or more other O-Cloud nodes in accordance with the received instantiation policy to the DMS; and upon receipt of the deployment instructions, creating, by the DMS, one or more NFs on the other one or more O-Cloud nodes.

18. The non-transitory computer-readable recording medium as claimed in claim 17, wherein the method for instantiating one or more NFs on at least one O-Cloud according to the implementation request further comprises:

based on the received instantiation policy, sending, by the NFO, instructions to deploy the determined one or more NFs on the one or more other O-Cloud nodes in accordance with the received instantiation policy to the DMS; and upon receipt of the deployment instructions, creating, by the DMS, one or more NFs on the other one or more O-Cloud nodes.

19. The non-transitory computer-readable recording medium as claimed in claim 15, wherein the method for finalizing the instantiation implementation of the determined one or more NFs further comprises:

implementing, by the at least one O-Cloud management service, the termination of the determined one or more NFs on the at least one O-Cloud node;

sending feedback, by the at least one O-Cloud management service, to the termination of the determined one or more NFs on the at least one O-Cloud node to the ORMOS.

20. The non-transitory computer-readable recording medium as claimed in claim 19, wherein the method for implementing the termination of the determined one or more NFs further comprises:

sending, by the NFO, a request to terminate the determined one or more NFs on the at least one O-Cloud to the DMS;

upon the termination of the determined one or more NFs, sending, by the DMS, a termination confirmation notice;

sending, by the NFO, a termination confirmation notice to the FOCOM;

based on the termination confirmation notice of the NFO, sending, by the FOCOM, an implementation request for unloading the at least one O-Cloud node hosting the terminated one or more NFs to the IMS; and upon receiving the implementation request for unloading, instructing, by the IMS, the draining and/or cordoning of the at least one O-Cloud node.

* * * * *